US011880088B2

(12) United States Patent
Seo

(10) Patent No.: US 11,880,088 B2
(45) Date of Patent: Jan. 23, 2024

(54) CAMERA MODULE

(71) Applicant: SAMSUNG ELECTRO-MECHANICS CO., LTD., Suwon-si (KR)

(72) Inventor: Bo Sung Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 200 days.

(21) Appl. No.: 17/370,293

(22) Filed: Jul. 8, 2021

(65) Prior Publication Data
US 2022/0099917 A1 Mar. 31, 2022

(30) Foreign Application Priority Data
Sep. 28, 2020 (KR) .................. 10-2020-0126284

(51) Int. Cl.
*G02B 7/00* (2021.01)
*G02B 27/64* (2006.01)
(Continued)

(52) U.S. Cl.
CPC .............. *G02B 7/09* (2013.01); *G02B 27/646* (2013.01); *G03B 5/00* (2013.01); *G03B 13/36* (2013.01); *G03B 2205/0007* (2013.01)

(58) Field of Classification Search
CPC .. G03B 5/00; G03B 13/36; G03B 2205/0007; G03B 2205/0053; G03B 2205/0069; G03B 3/02; G03B 3/10; G03B 5/04; G03B 30/00; G02B 7/021; G02B 7/08; G02B 7/09; G02B 7/10; G02B 9/62; G02B 13/001; G02B 13/0065; G02B 27/646; H04N 5/2253; H04N 5/2254; H04N 5/2257;
(Continued)

(56) References Cited

U.S. PATENT DOCUMENTS

2013/0162851 A1 6/2013 Shikama et al.
2015/0055220 A1* 2/2015 Lim .................... G02B 27/646
359/557
(Continued)

FOREIGN PATENT DOCUMENTS

KR 10-2010-0109831 A 10/2010
KR 10-2013-0075682 A 7/2013
(Continued)

OTHER PUBLICATIONS

Indian Office Action dated Jul. 5, 2022, in counterpart Indian Patent Application No. 202114034779 (7 Pages in English).
(Continued)

*Primary Examiner* — Marin Pichler
(74) *Attorney, Agent, or Firm* — NSIP Law

(57) ABSTRACT

A camera module includes: a housing; a carrier disposed to oppose the housing in a first direction and to move in a second direction perpendicular to the first direction; and a ball member disposed between opposing surfaces of the carrier and the housing. The housing is in contact with the ball member at a first point, and the carrier is in contact with the ball member at a second point, A distance in the first direction from a center of the ball member to the first point is greater than a distance in the first direction from a center of the ball member to the second point.

24 Claims, 17 Drawing Sheets

(51) Int. Cl.
*G03B 5/00* (2021.01)
*G03B 13/36* (2021.01)
*G02B 7/09* (2021.01)

(58) Field of Classification Search
CPC .. H04N 5/23287; H02K 11/33; H02K 11/215; H02K 41/0356
USPC ....... 359/911, 554, 555, 557, 811, 813, 814, 359/824, 872, 877
See application file for complete search history.

(56) References Cited

U.S. PATENT DOCUMENTS

| | | |
|---|---|---|
| 2017/0108705 A1 | 4/2017 | Yu et al. |
| 2017/0139225 A1 | 5/2017 | Lim |
| 2017/0205600 A1* | 7/2017 | Kim ..................... G02B 7/08 |
| 2020/0050083 A1 | 2/2020 | Jeong et al. |
| 2020/0084308 A1 | 3/2020 | Yoon et al. |
| 2021/0132329 A1* | 5/2021 | Lim ..................... G03B 3/10 |
| 2021/0247588 A1* | 8/2021 | Huang ............... H02K 41/0356 |

FOREIGN PATENT DOCUMENTS

| | | |
|---|---|---|
| KR | 10-2016-0024319 A | 3/2016 |
| KR | 10-2017-0056387 A | 5/2017 |
| KR | 10-2020-0016625 A | 2/2020 |
| KR | 10-2020-0073096 A | 6/2020 |

OTHER PUBLICATIONS

Korean Office Action dated Dec. 24, 2021 in corresponding Korean Patent Application No. 10-2020-0126284. (6 pages in English and 5 pages in Korean).

\* cited by examiner

CAMERA MODULE

CROSS-REFERENCE TO RELATED APPLICATIONS

This application claims the benefit under 35 U.S.C. § 119(a) of Korean Patent Application No. 10-2020-0126284 filed on Sep. 28, 2020 in the Korean Intellectual Property Office, the entire disclosure of which is incorporated herein by reference for all purposes.

BACKGROUND

1. Field

The following description relates to a camera and, for example, an autofocusing function and an optical image stabilization function of a camera.

2. Description of Related Art

Recently, a camera module has been employed in mobile communication terminals such as smartphones, tablet PCs, laptops, and the like. A camera module may be equipped with an autofocusing function and an optical image stabilization function.

The autofocusing function may be implemented by moving a lens, or a structure including the lens, in an optical axis direction with respect to a housing. A ball may be disposed between a lens barrel, or a carrier including the lens barrel, and the housing, to reduce friction when the lens barrel/carrier moves relative to the housing. The ball disposed between the lens barrel/carrier and the housing may function as a wheel and may support the lens barrel/carrier to move relative to the housing with a relatively small amount of force.

The ball may roll according to the relative movement between the lens barrel/carrier and the housing. When the lens barrel/carrier moves relative to the housing, the ball may move by a corresponding amount. The lens barrel may be supported by an internal wall of the housing through a magnetic attraction force (pulling force) between a pulling magnet and a pulling yoke. However, when a point at which the pulling force is applied and an area in which the balls support the barrel are misaligned, unintended shaking may occur between the two components.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a housing; a carrier disposed to oppose the housing in a first direction and to move in a second direction perpendicular to the first direction; and a ball member disposed between opposing surfaces of the carrier and the housing. The housing is in contact with the ball member at a first point, and the carrier is in contact with the ball member at a second point, A distance in the first direction from a center of the ball member to the first point is greater than a distance in the first direction from a center of the ball member to the second point.

The ball member may be disposed between the housing and the carrier, and may be configured to support the carrier in the first direction.

The camera module may further include: a first magnetic member disposed in the carrier; and a second magnetic member disposed in the housing and configured to generate a magnetic attractive force in the first direction between the first magnetic member and the second magnetic member.

The ball member may include at least three ball members. While the carrier moves with respect to the housing, a center of the magnetic attractive force between the first magnetic member and the second magnetic member may be disposed in a region having the at least three ball members as vertices.

Two or more of the at least three ball members may be disposed on one side of a movement path of the first magnetic member, and one or more of the at least three ball members may be disposed on another side of the movement path of the first magnetic member.

The ball member may be partially accommodated in a first groove disposed in the housing and a second groove disposed in the carrier.

The ball member may be supported by the first groove at one point or two points in the first groove, and is supported by the second groove at two points in the second groove.

The first groove may have a V-shaped cross-sectional surface, and the second groove has a quadrangular cross-sectional surface.

Ether one or both of the first groove and the second groove may be formed by a metal member insert molded into the carrier.

When the ball member is supported by the first groove at two points in the first groove. A distance between two points in the first groove may be less than a distance between supporting points of the ball member in the second groove.

A side surface of the first groove may be inclined at a first angle with respect to the opposing surfaces. A side surface of the second groove may be inclined at a second angle or vertical with respect to the opposing surfaces. The second angle may be greater than the first angle.

The camera module may further include at least one lens. The carrier may be configured to move in a direction parallel to an optical axis of the at least one lens.

In another general aspect, a camera module includes: a housing; a carrier configured to move with respect to the housing; and a ball member disposed between the carrier and the housing. The ball member is configured to roll while being in contact with the housing. In a case in which the ball member rolls without sliding while being in contact with the carrier and the housing, a rotational radius ($r_1$) of the ball member with respect to the housing is greater than a rotational radius ($r_2$) of the ball member with respect to the carrier.

A ratio of an amount of movement of the ball member with respect to the housing to an amount of movement of the carrier with respect to the housing may be determined by $r_1/(r_1+r_2)$, and may be greater than 0.58 and less than 1.0.

The camera module may further include: a first magnetic member disposed in the carrier; and a second magnetic member disposed in the housing and configured to generate a magnetic attractive force between the first magnetic member and the second magnetic member.

The ball member may include at least three ball members. While the carrier moves with respect to the housing, a center of the magnetic attractive force between the first magnetic member and the second magnetic member may be disposed in a region having the at least three ball members as vertices.

The ball member may include: two first ball members disposed on one side of the first magnetic member, with respect to a movement path of the first magnetic member; and a second ball member disposed on another side of the first magnetic member, with respect to the movement path. While the carrier moves with respect to the housing, a center of the magnetic attractive force between the first magnetic member and the second magnetic member may be disposed in a triangular region having the two first ball members and the second ball member as vertices.

In another general aspect, a camera module includes: a housing; a carrier configured to move in an optical axis direction with respect to the housing; two or more ball members disposed between the carrier and the housing, and configured to roll in the optical axis direction to guide movement of the carrier in the optical axis direction; a first magnetic member disposed in the carrier; and a second magnetic member disposed in the housing and configured to generate a magnetic attractive force between the first magnetic member and the second magnetic member to maintain the two or more ball members in contact with the carrier and the housing. While the carrier moves with respect to the housing, a center of the magnetic attractive force between the first magnetic member and the second magnetic member is disposed in a region having the two or more ball members as vertices.

The two or more ball members may include at least three ball members.

The at least three ball members may include: two first ball members disposed on one side of the first magnetic member, with respect to a movement path of the first magnetic member; and a second ball member disposed on another side of the first magnetic member, with respect to the movement path. The region having the at least three ball members as vertices may be a triangle having the two first ball members and the second ball member as vertices.

The carrier may oppose the housing in a direction perpendicular to the optical axis direction. A ball member, among the two or more ball members, may be in contact with the housing at a first point and may be in contact with the carrier at a second point. A distance from a center the ball member to the first point in the direction perpendicular to the optical axis direction may be greater than a distance from the center the ball member to the second point in the direction perpendicular to the optical axis direction.

A ratio of a movement distance of a ball member, among the two or more ball members, in the optical axis direction with respect to the housing to a movement distance of the carrier in the optical axis direction with respect to the housing may be greater than 0.58 and less than 1.0.

In another general aspect, an electronic device includes a camera module including: a housing mounted in the electronic device; a carrier disposed to oppose the housing in a first direction and to move in a second direction perpendicular to the first direction; a lens module attached to the carrier and configured to move in the second direction with the carrier; and a ball member disposed between opposing surfaces of the carrier and the housing. The housing is in contact with the ball member at a first point, and the carrier is in contact with the ball member at a second point. A distance in the first direction from a center of the ball member to the first point is greater than a distance in the first direction from a center of the ball member to the second point.

The second direction may be parallel to an optical axis of the lens module.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
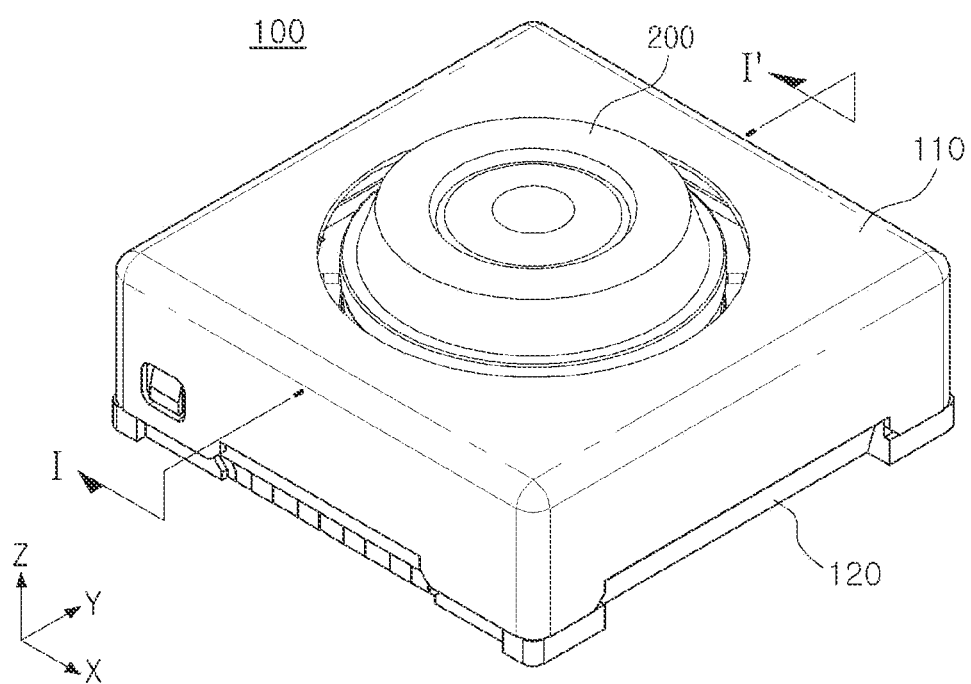
FIG. 1 is a perspective diagram illustrating a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed, as will be apparent after gaining an understanding of this disclosure, with the exception of operations necessarily occurring in a certain order. Also, descriptions of features known in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after gaining an understanding of the disclosure of this application. Further, although the examples described herein have a variety of configurations, other configurations are possible as will be apparent after gaining an understanding of the disclosure of this application.

Embodiments disclosed herein relate to a lens driving device and a camera module including the lens driving device, which, for example, may be applied to a portable electronic device such as a mobile communication terminal device, a smartphone, a tablet PC, and the like.

A camera module may be implemented as an optical device for obtaining an image or a video, and may include a lens configured to refract light reflected from a subject and a lens driving device configured to move the lens to adjust a focus or to correct shaking.

Figure 2:
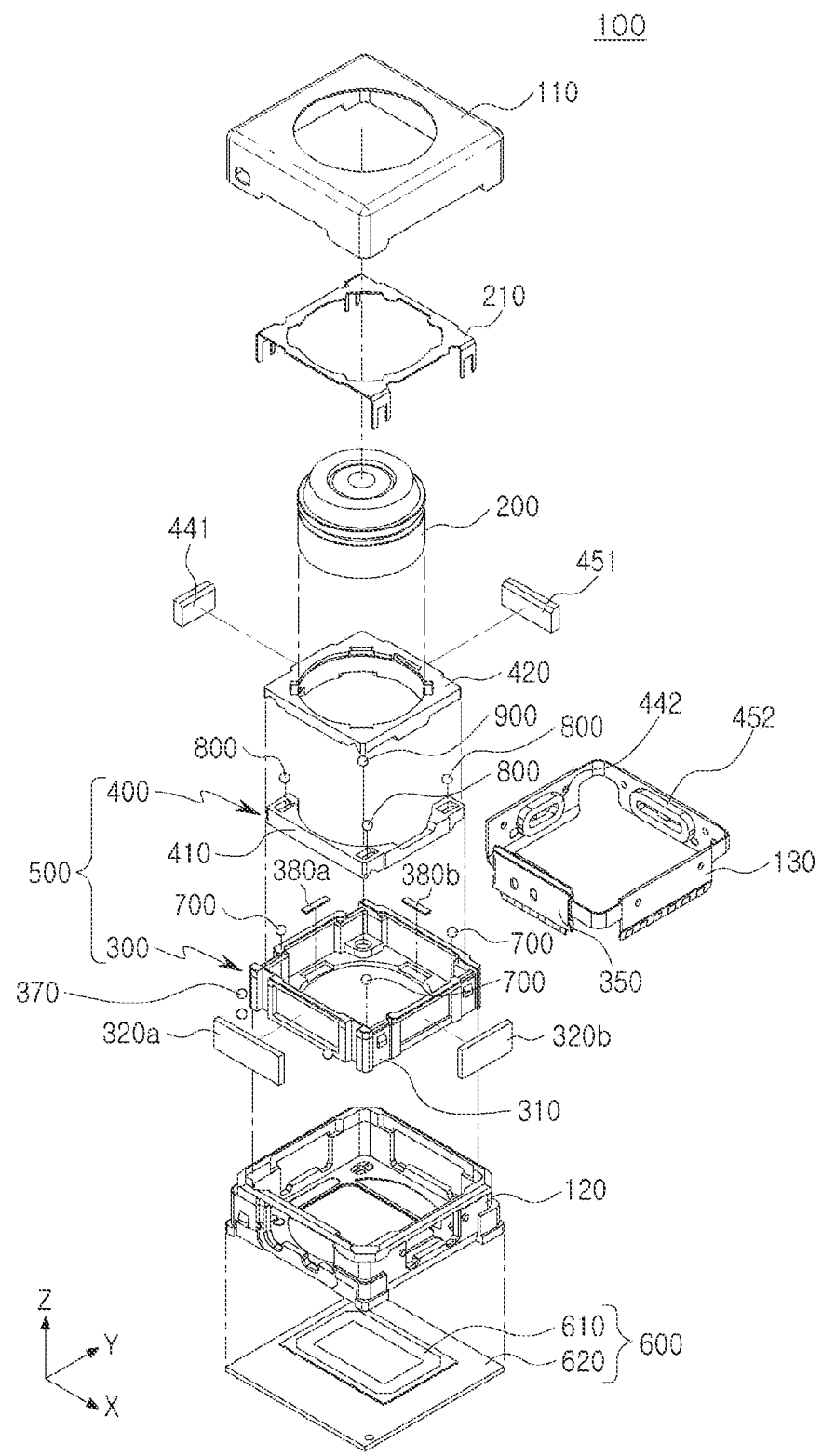
FIG. 2 is an exploded perspective diagram illustrating the camera module of FIG. 1, according to an embodiment.

FIG. 1 is a perspective diagram illustrating a camera module 100, according to an embodiment. FIG. 2 is an exploded perspective diagram illustrating the camera module 100.

Referring to FIGS. 1 and 2, the camera module 100 may include, for example, a lens barrel 200, a lens driving device 500 configured to move the lens barrel 200, an image sensor unit (or image sensor assembly) 600 configured to convert light incident through the lens barrel 200 into an electrical signal, a housing 120 configured to accommodate the lens barrel 200 and the lens driving device 500, and a case 110 configured to cover the housing 120.

The lens barrel 200 may have a hollow cylindrical shape to accommodate a plurality of lenses for imaging a subject, and the plurality of lenses may be mounted on the lens barrel 200 along an optical axis. The desired number of the plurality of lenses may be arranged according to a design of the lens barrel 200, and the lenses may have optical characteristics such as the same refractive index or different refractive indexes.

For example, the lens driving device 500 may adjust a focus by moving the lens barrel 200 in a direction of the optical axis (Z axis) (hereinafter, "optical axis direction"), and may correct shaking while imaging by moving the lens barrel 200 in a direction perpendicular to the optical axis (Z axis).

The lens driving device 500 may include a focus adjustment unit (or focus adjustment assembly) 300 configured to adjust a focus and a shake correction unit 400 (or shake correction assembly) for correcting shaking.

For example, the image sensor unit 600 may include an image sensor 610 and a printed circuit board 620 on which the image sensor 610 is mounted, and may further include an infrared filter. The infrared filter may block light in the infrared range of light incident through the lens barrel 200.

The image sensor 610 may convert light incident through the lens barrel 200 into an electric signal. For example, the image sensor 610 may be a charge coupled device (CCD) or a complementary metal-oxide semiconductor (CMOS).

The electrical signal converted by the image sensor 610 may be output as an image through a display unit of a portable electronic device.

The image sensor 610 may be electrically connected to the printed circuit board 620 through wiring bonding.

The lens barrel 200 and the lens driving device 500 may be accommodated in the housing 120. For example, the housing 120 may have open upper and lower portions, and the lens barrel 200 and the lens driving device 500 may be accommodated in the housing 120.

The image sensor unit 600 may be disposed in a lower portion of the housing 120.

The case 110 may be coupled to the housing 120 to surround an external surface of the housing 120, and may protect internal components of the camera module 100.

Also, the case 110 may shield electromagnetic waves. For example, the case 110 may be formed of a metal material and may be grounded to a ground pad provided on the printed circuit board 620, thereby shielding electromagnetic waves. For example, the case 110 may shield electromagnetic waves such that electromagnetic waves generated from the camera module 100 may not affect the other electronic components in a portable electronic device on which the camera module 100 is mounted. Further, since various electronic components other than the camera module may be mounted on the portable electronic device, the case 110 may shield the electromagnetic waves such that electromagnetic waves generated from the electronic components do not affect the camera module 100.

Figure 3:
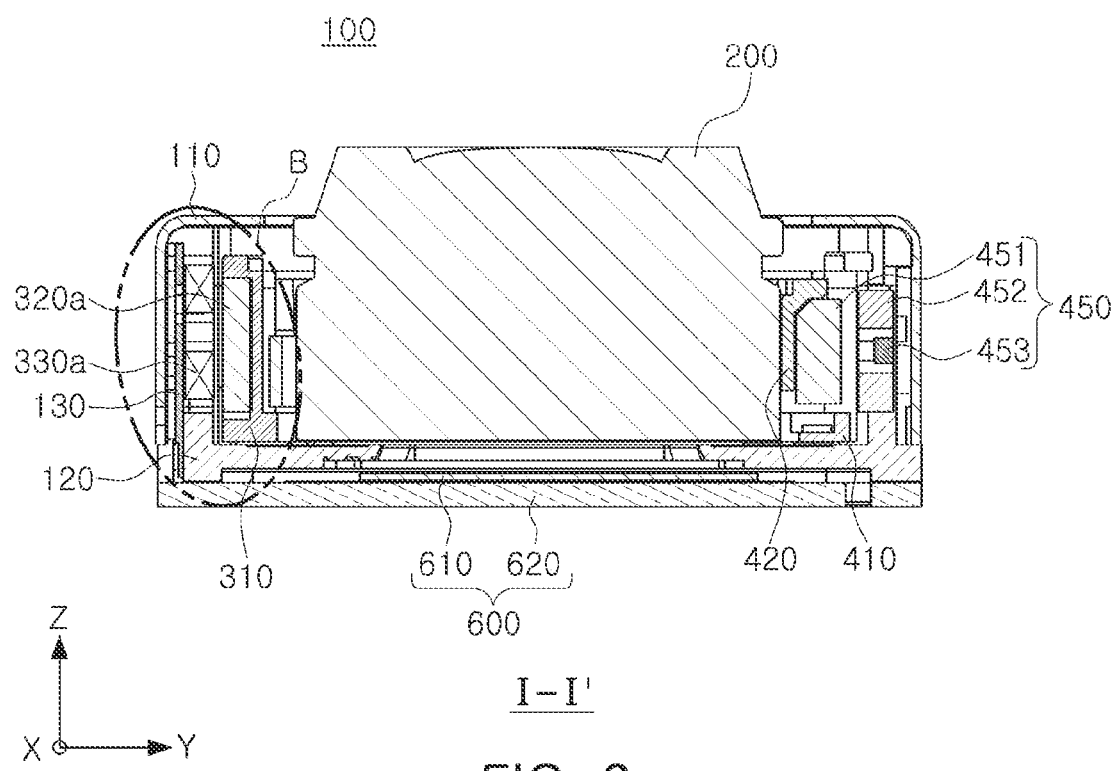
FIG. 3 is a cross-sectional diagram taken along line I-I' in FIG. 1.
Figure 4:
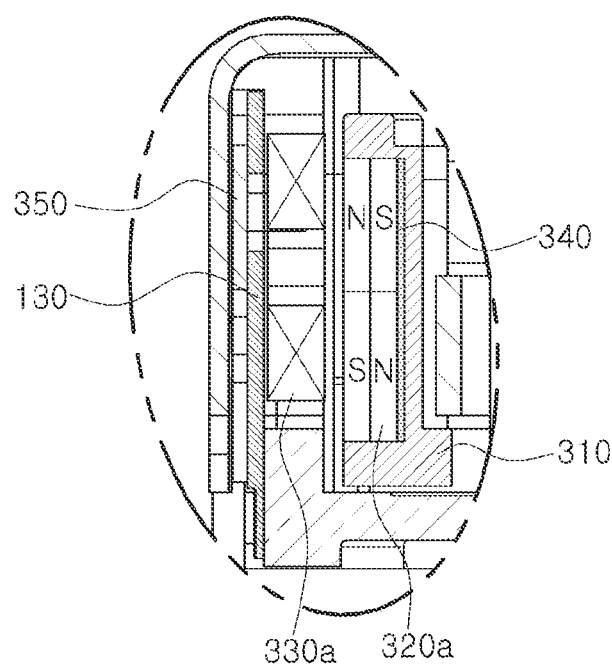
FIG. 4 is an enlarged diagram illustrating portion B illustrated in FIG. 3.
Figure 5:
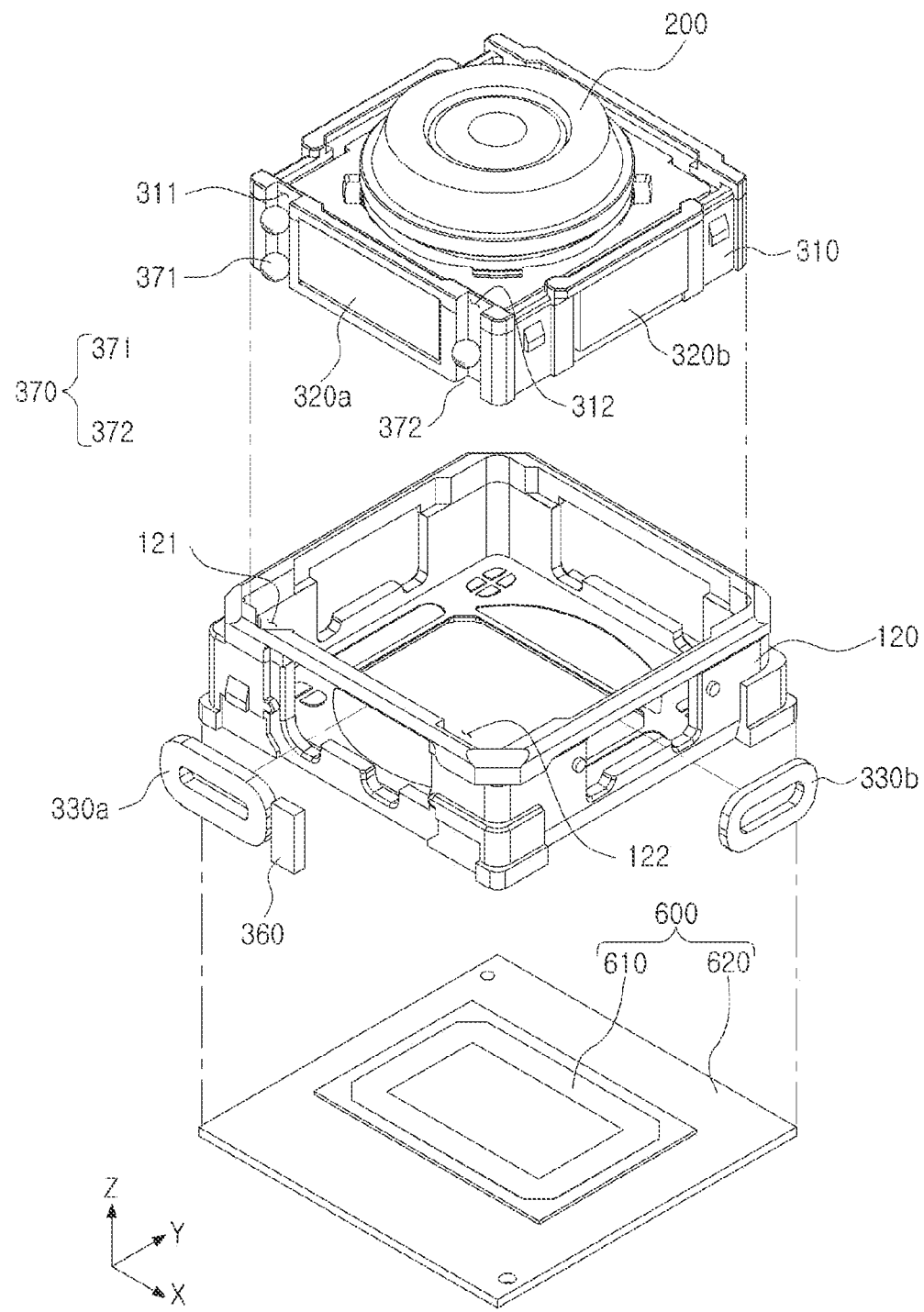
FIG. 5 is another exploded perspective diagram illustrating the camera module of FIG. 1, according to an embodiment.
Figure 6:
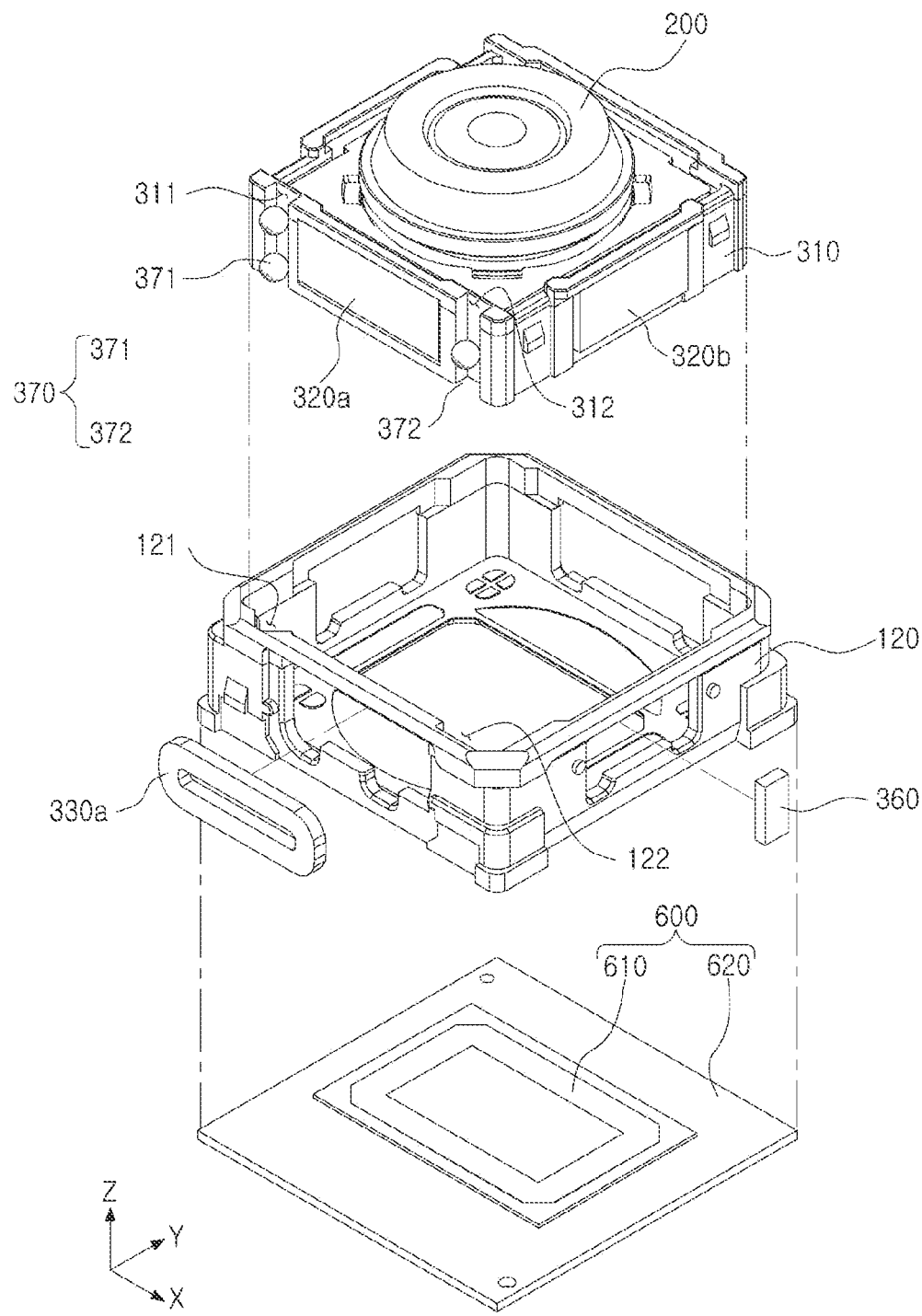
FIG. 6 is a perspective diagram illustrating a modified example of a focus adjustment unit of a lens driving device, according to an embodiment.

FIG. 3 is a cross-sectional diagram taken along line I-I' in FIG. 1. FIG. 4 is an enlarged diagram illustrating portion B illustrated in FIG. 3. FIG. 5 is another exploded perspective diagram illustrating the camera module 100, according to an embodiment. FIG. 6 is a perspective diagram illustrating a modified example of the focus adjustment unit 300 of the lens driving device 500, according to an embodiment.

The focus adjustment unit 300 of the lens driving device 500 according to an embodiment will be described with reference to FIGS. 3 to 6.

In the lens driving device 500, the lens barrel 200 may be moved to focus on a subject. For example, in an embodiment, the focus adjustment unit 300 may be configured to move the lens barrel 200 in the optical axis (Z axis) direction.

The focus adjustment unit 300 may include a carrier 310 configured to accommodate the lens barrel 200, and a focus adjustment driving unit (or focus adjustment driving assembly) configured to generate driving force to move the lens barrel 200 and the carrier 310 in the optical axis (Z axis) direction.

The focus adjustment driving unit may include, for example, a magnet 320a and a coil 330a.

The magnet 320a may be mounted on the carrier 310. For example, the magnet 320a may be mounted on one surface of the carrier 310.

The coil 330a may be mounted on the housing 120. For example, the coil 330a may be mounted on the housing 120 by coupling the substrate 130 to which the coil 330a is attached to the housing 120. FIG. 2 does not illustrate the coil 330a, but the coil 330a may be fixed to the substrate 130 and may be disposed in a position opposing the coil 452 of the shake correction unit 400.

The magnet 320a may be a movable member mounted on the carrier 310 and configured to move in the optical axis (Z axis) direction along with the carrier 310. The coil 330a may be a fixed member fixed to the housing 120. However, the disclosure is not limited to the foregoing configuration, and the positions of the magnet 320a and the coil 330a may be switched with each other.

When power is applied to the coil 330a, the carrier 310 may move in the optical axis (Z axis) direction by an electromagnetic force between the magnet 320a and the coil 330a.

Since the lens barrel 200 is accommodated in the carrier 310, the lens barrel 200 may also move in the optical axis (Z axis) direction by the movement of the carrier 310.

When the carrier 310 moves, a rolling member 370 may be disposed between the carrier 310 and the housing 120 to reduce friction between the carrier 310 and the housing 120. The rolling member 370 may have a ball shape.

The rolling member 370 may be disposed on both sides of the magnet 320a. In an embodiment, when the magnet 320a is attached to one side surface of the carrier 310, the rolling member 370 may be disposed to support the carrier 310 while being in contact with the side surface. For example, when the magnet 320a moves in the first direction (Z-axis direction), a portion of the rolling member 370 may be disposed on one side of a movement path of the magnet 320a, and another portion may be disposed on the other side of the movement path of the magnet 320a.

In an embodiment illustrated in the diagram, the rolling member 370 may be provided in a ball shape, and is referred to as a ball member hereinafter for ease of description.

In an embodiment, the ball member 370 may include three ball members disposed between the carrier 310 and the housing 120. For example, two ball members (e.g., 371a and 371b in FIG. 12) may be disposed on one side of the magnet 320a, and a single ball member (e.g., 372 in FIG. 12) may be disposed on the other side of the magnet 320a. However, a size, the number, and arrangement of the ball member 370 illustrated in the diagram are merely example, and are not limited to the illustrated example. In embodiments, the size, the number and the arrangement of the ball member 370 may be varied. For example, three ball members may be disposed on one side and the other side of the magnet 320a. As another example, ball members having different diameters may be provided between the housing 120 and the carrier 310.

A first yoke 350 may be disposed in the housing 120, and the first yoke 350 may generate attractive force in a direction perpendicular to the optical axis (Z axis) between the magnet 320a and the first yoke 350.

Accordingly, the ball member 370 may maintain a state of contact with the carrier 310 and the housing 120 by the attractive force formed between the first yoke 350 and the magnet 320a. The ball member 370 may maintain the state of contact with the carrier 310 and the housing 120 such that the lens barrel 200 may always move in a direction parallel to the Z axis even while a focal length is adjusted.

Also, the first yoke 350 may also be configured to focus a magnetic force of the magnet 320a. Accordingly, a leakage of magnetic flux may be prevented.

As an example, the first yoke 350 and the magnet 320a may form a magnetic circuit.

In an embodiment, the magnet 320a may be included in a driving unit for adjusting autofocusing (AF), but in another embodiment, a magnetic member distinguished from the magnet 320a may generate a magnetic attractive force with the first yoke 350. The magnetic member may include a yoke or a magnet, and when another magnetic member is a yoke, the first yoke 350 may be replaced with a magnet.

In an embodiment, the magnet 320a may be driven in the optical axis direction, and the length of the first yoke 350 in the optical axis (Z axis) direction may be longer than the length of the magnet 320a in the optical axis (Z axis) direction. When the length of the first yoke 350 in the optical axis (Z axis) direction is shorter than the length of the magnet 320a in the optical axis (Z axis) direction, and the magnet 320a moves in the optical axis (Z axis) direction, attractive force working for a center of the magnet 320a to be directed to a center of the first yoke 350 may increase.

Accordingly, a returning force in which the magnet 320a returns to an original position may increase, and the amount of current required to move the magnet 320a may increase, and consumption power may increase.

However, when the length of the first yoke 350 in the optical axis (Z axis) direction is longer than the length of the magnet 320a in the optical axis (Z axis) direction, the attractive force working for the center of the magnet 320a to be directed to the center of the first yoke 350 may relatively decrease, such that power consumption may be reduced.

Referring to FIG. 4, a second yoke 340 may be disposed between the carrier 310 and the magnet 320a. The second yoke 340 may be configured to focus the magnetic force of the magnet 320a. Accordingly, leakage of magnetic flux may be prevented. For example, the second yoke 340 and the magnet 320a may form a magnetic circuit.

A magnet 320b and a coil 330b may be further provided to ensure a sufficient driving force during focus adjustment.

When the area in which the magnet is mounted decreases according to the trend of reducing a size of a camera module, the size of the magnet may decrease, and accordingly, sufficient driving force required for focus adjustment may not be secured.

According to an embodiment, magnets 320a and 320b may be attached to different surfaces of the carrier 310, respectively, and the coils 330a and 330b may be provided on different surfaces of the housing 120 to face the magnet 320a and 320b. Accordingly, even when the mounting area of the magnet is small, sufficient driving force required for focus adjustment may be provided.

Referring to FIG. 6, in a modified example, one magnet 320a of a plurality of magnets 320a and 320b mounted on different surfaces of the carrier 310 may oppose the coil 330a, the other magnet 320b may oppose a position sensor 360.

In other words, one magnet 320a of the plurality of magnets 320a and 320b may function as a driving magnet, and the other magnet 320b may function as a sensing magnet.

In this case, since the coil 330a and the position sensor 360 are disposed on different surfaces of the housing 120 and are spaced apart from each other, and a spatial margin may be formed in the surface on which the coil 330a is mounted. Accordingly, the number of windings of the coil 330a may increase, thereby improving driving force.

Also, since the coil 330a and the position sensor 360 are disposed on different surfaces of the housing 120 and are spaced apart from each other, the effect of an electrical field of the coil 330a on the position sensor 360 may be reduced. Accordingly, sensing accuracy of the position sensor 360 may improve.

In an embodiment, a closed loop control method of sensing the position of the lens barrel 200 and providing a feedback may be used.

Therefore, the position sensor 360 may be required for closed loop control. For example, the position sensor 360 may be a hall sensor. As another example, the position sensor 360 may be replaced with a position sensing unit configured to measure inductance. A detailed description thereof will be described with reference to FIGS. 7 and 8.

The position sensor 360 may be disposed on an internal side or an external side of the coil 330a, and the position sensor 360 may be mounted on the substrate 130 on which the coil 330a is mounted.

Also, the position sensor 360 may be integrated with a circuit device providing a driving signal to the focus adjustment unit 300 (see FIG. 5). However, an embodiment thereof is not limited thereto, and the position sensor 360 and the circuit device may be provided as separate components.

When the camera module is turned on, an initial position of the lens barrel 200 may be sensed by the position sensor 360, and the lens barrel 200 may be moved to an initial setting position by the driving signal of the circuit device.

The lens barrel 200 may be moved from the initial setting position to a target position.

In the focus adjustment process, the lens barrel 200 may move forwards and backwards (moving in both directions) in the optical axis (Z axis) direction from the initial setting position.

Figure 7:
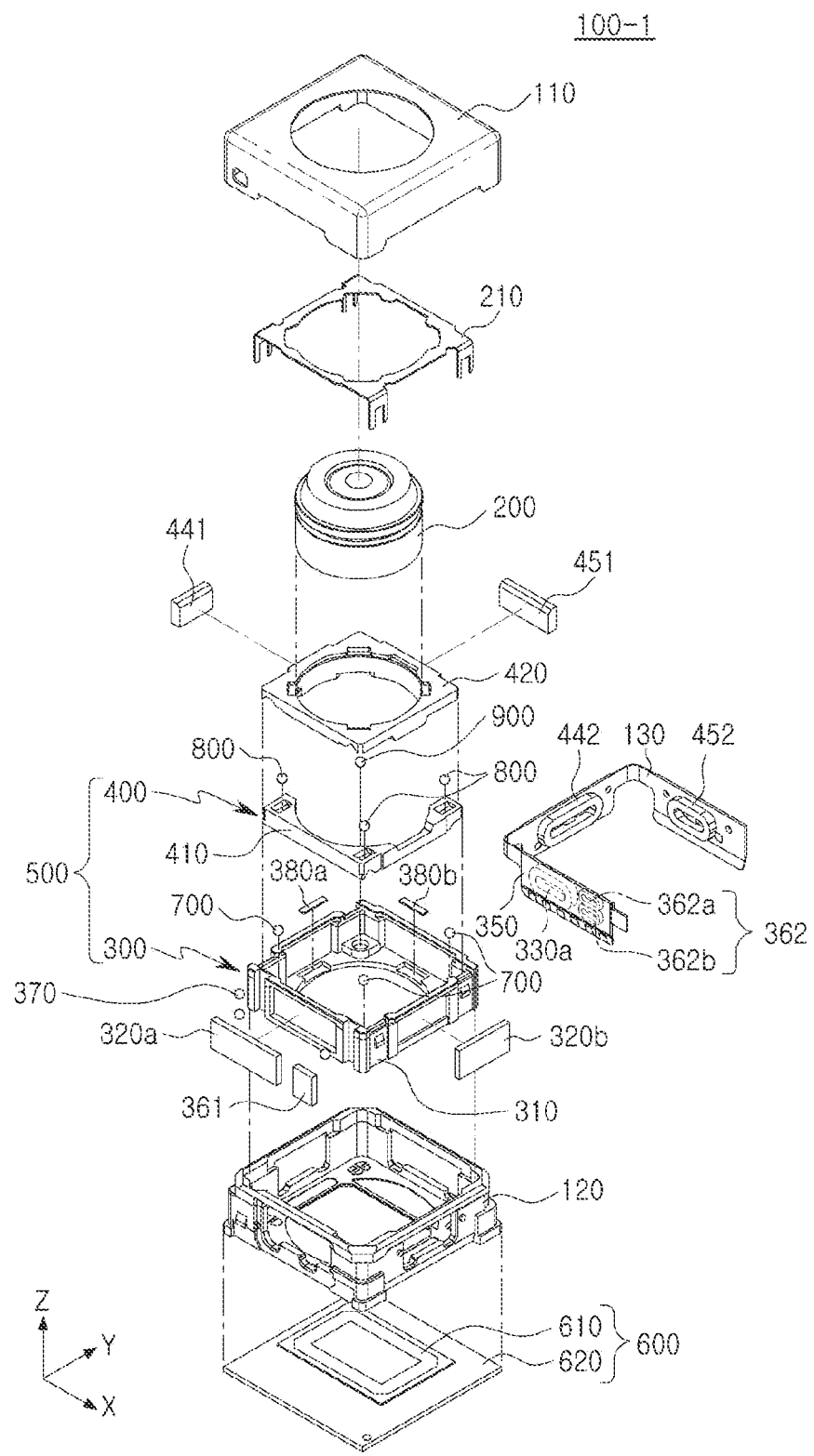
FIG. 7 is an exploded perspective diagram illustrating a camera module, according to another embodiment.
Figure 8:
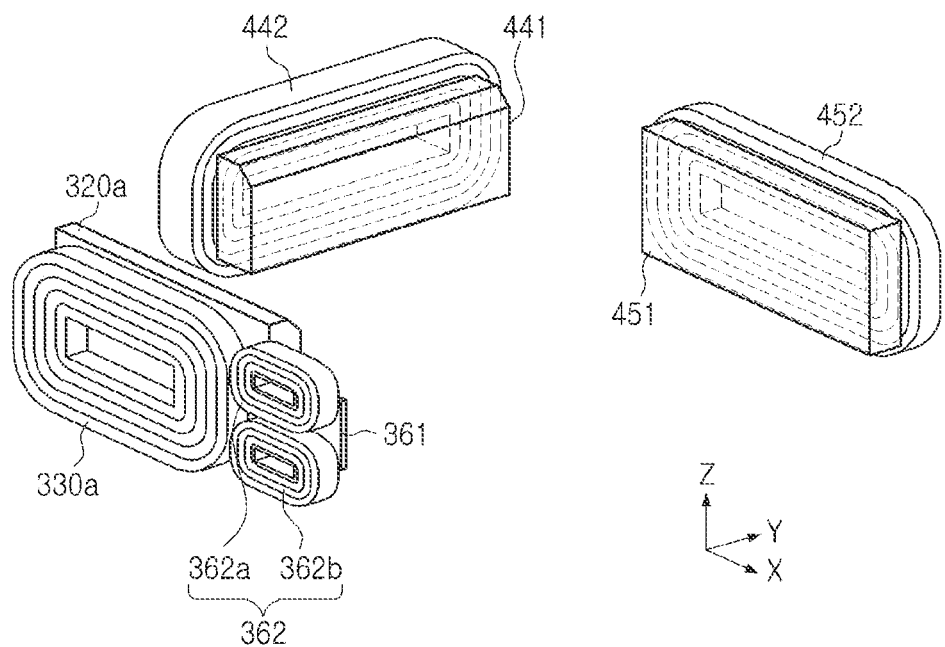
FIG. 8 is a diagram illustrating a position sensing unit of the camera module of FIG. 7, according to an embodiment.

FIG. 7 is an exploded perspective diagram illustrating a camera module 100-1, according to an embodiment. FIG. 8 is a diagram illustrating a position sensing unit (or position sensing assembly) of the camera module 100-1, according to an embodiment.

The camera module illustrated in FIG. 7 may have a position sensor different from that of the camera module illustrated in FIG. 2. Accordingly, the camera module in FIG. 7 may be distinguished from the camera module in FIG. 2 with respect to elements for sensing a position of the lens barrel 200. In the interest of conciseness, overlapping descriptions will not be repeated in the following discussion of FIG. 7.

Referring to FIGS. 7 and 8, in an embodiment, the camera module 100-1 may include a position sensing unit for closed loop control. The position sensing unit may include a sensing coil 362 and a controller. The controller may receive an inductance value from the sensing coil 362 and may detect a position of the lens barrel 200 in the optical axis direction (Z axis direction).

Similarly to the coil 330a, the sensing coil 362 may also be configured as a copper foil pattern that is laminated and embedded in the substrate 130.

The sensing coil 362 may be disposed to oppose a sensing yoke 361 that is disposed adjacent to a magnet 320a. The sensing yoke 361 may be mounted on one surface of the carrier 310, and the sensing yoke 361 may be formed of a conductor or a magnetic material.

The sensing coil 362 may be disposed to oppose the sensing yoke 361 in a direction perpendicular to the optical axis (Z axis). Also, the sensing coil 362 may be disposed in a position adjacent to the coil 330a.

As the carrier 310 moves in the optical axis direction (Z axis direction), the sensing yoke 361, due to being mounted on the carrier 310, may also move in the optical axis direction (Z axis direction). Accordingly, inductance of the sensing coil 362 may change. The controller may receive an inductance value from the sensing coil 362 and may detect the position of the lens barrel 200 (the position in the optical axis direction (Z axis direction)).

Accordingly, the position of the sensing yoke 361 may be detected from a change in inductance of the sensing coil 362. Since the sensing yoke 361 is mounted on the carrier 310, the lens barrel 200 is accommodated in the carrier 310, and the carrier 310 moves along with the lens barrel 200 in the optical axis direction (Z axis direction), the position of the lens barrel 200 (the position in the optical axis direction (Z axis direction)) may be detected from a change in inductance of the sensing coil 362.

The sensing coil 362 may include a plurality of coils disposed in line with each other along the optical axis direction (Z axis direction). For example, the sensing coil 362 may include two coils disposed along the optical axis direction (Z axis direction). One of the two coils will be referred to as a first sensing coil 362a, and the other will be referred to as a second sensing coil 362b.

The position sensing unit may further include at least one capacitor, and the at least one capacitor and the sensing coil 362 may form an oscillation circuit. For example, the at least one capacitor may be provided in a number corresponding to the number of coils included in the sensing coil 362, such that each capacitor among the at least one capacitor corresponds to one coil of the sensing coil 362. For example, one capacitor and one coil 362a or 362b may be configured in the form of an LC oscillator.

The position sensing unit may determine a displacement of the lens barrel 200 on the basis of a change in a frequency of the oscillation signal generated by the oscillation circuit. Specifically, when the inductance of the sensing coil 362 forming the oscillation circuit changes, a frequency of the oscillation signal generated by the oscillation circuit may change, and displacement of the lens barrel 200 may be detected on the basis of the change in the frequency.

In an embodiment, the sensing coil 362 may oppose the sensing yoke 361, but the disclosure is not limited to such a configuration. The sensing yoke 361 may not be provided, and the sensing coil 362 may be disposed to oppose the magnet 320a.

In the further description below, it is to be understood that descriptions related to the camera module 100 may apply equally to the camera module 100-1 of FIGS. 7 and 8.

Figure 9:
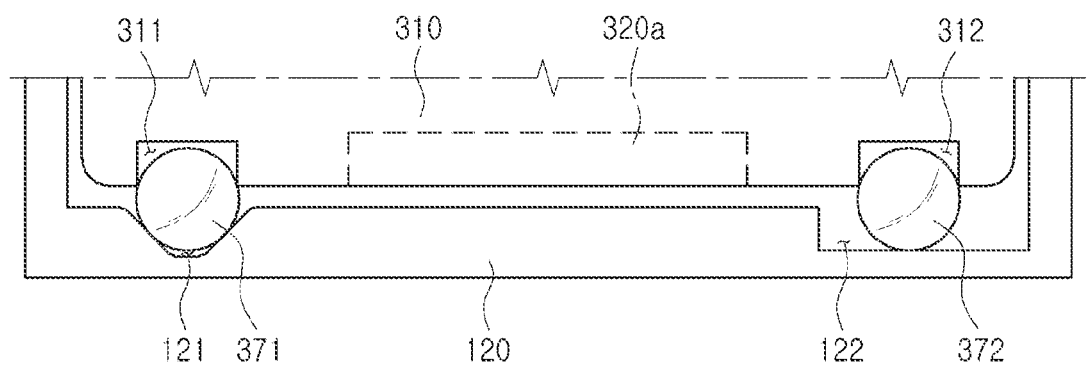
FIG. 9 is a diagram illustrating ball members disposed between a housing and a carrier, according to an embodiment.

FIG. 9 is a diagram illustrating the ball member 370 disposed between the housing 120 and the carrier 310, according to an embodiment.

Referring to FIGS. 2, 7, and 9, in an embodiment, the ball members 370 may be disposed between the housing 120 and the carrier 310. Each of the housing 120 and the carrier 310 may include a guide for accommodating a portion of the ball member 370.

In an embodiment, the guide for the ball member 370 may include grooves 121, 122, 311, and 312 recessed into one surface of the housing 120 or the carrier 310. In an embodiment, the grooves 121, 122, 311, and 312 may extend in a moving direction (or in a direction parallel to the optical axis) of the carrier 310.

When the grooves 121, 122, 311, and 312 extend in parallel to the optical axis direction, the moving direction of the ball member 370 partially accommodated in the grooves 121, 122, 311, and 312 may be determined to be parallel to the optical axis direction. Since the ball member 370 moves along the direction in which the grooves 121, 122, 311, and 312 extend, the grooves 121, 122, 311, and 312 provided on both sides of the ball member 370 may guide the carrier 310 to move in a direction parallel to the optical axis with respect to the housing 120.

In an embodiment, the ball member 370 may include a first ball member 371 disposed on one side of the magnet 320a and a second ball member 372 disposed on another side of the magnet 320a. In this disclosure, with reference to the magnet 320a (or the movement path of the magnet 320a), the ball member 371 is disposed in a −X direction and will be referred to as the first ball member 371, and the ball member 372 is disposed in a +X direction and will be referred to as the second ball member 372. In the description below, first and second ball members 371 and 372 may be collectively referred to as the singular ball member 370 for ease of description. The ball member 370, however, may include two or more ball members. For example, the first ball member 371 may include two or more first ball members.

In an embodiment, the carrier 310 and the housing 120 may include the grooves 121, 122, 311, and 312 for partially accommodating the ball member 370. In an embodiment, the housing 120 and the carrier 310 may include a first groove 121 and a second groove 311 which may partially accommodate the first ball member 371, respectively. The housing 120 and the carrier 310 may include a third groove 122 and a fourth groove 312 which may partially accommodate the second ball member 372, respectively. In an embodiment, the first groove 121 and the second groove 311 may be disposed on the one side with reference to the movement path of the magnet 320a, and the third groove 122 and the fourth groove 312 may be disposed on the other side with reference to the movement path of the magnet 320a.

In an embodiment, guides in contact with the ball member 370 on both sides of the ball member 370 may have different shapes. The first groove 121 and the second groove 311 may be asymmetrical with reference to the first ball member 371 disposed therebetween. The third groove 122 and the fourth groove 312 may also be asymmetrical with reference to the second ball member 372.

In the illustrated embodiment, cross-sectional surfaces of the first groove 121 and the second groove 311, perpendicular to a length direction, may be different from each other. The first groove 121 may have a V-shaped cross-sectional surface, whereas the second groove 311 may have a quadrangular cross-sectional surface. Also, cross-sectional surfaces of the third groove 122 and the fourth groove 312, perpendicular to the length direction, may be different from each other. The third groove 122 may have a cross-sectional surface having a wide bottom surface (relative to the fourth groove 312), whereas the fourth groove 312 may have a cross-sectional surface having a narrow bottom surface (relative to the third grove 312).

In an embodiment, a portion defining the grooves 121, 122, 311, and 312 for accommodating the ball member 370 in the carrier 310 or the housing 120 may include a material different from a material of the other portion of the carrier 310. For example, a bottom surface defining the first groove 121 and/or the second groove 311 and a sidewall extending from the bottom surface may include a metal.

In an embodiment, the carrier 310 may include a metal part including first to fourth grooves 121, 122, 311, and 312 configured to accommodate the ball member 370. In an embodiment, the metal part may be integrated with the carrier 310. For example, the carrier 310 may include plastic and a metal part which may be double-injected (or insert molded) into the plastic. Accordingly, the metal part double-injected into the carrier 310 may define at least a portion of the first to fourth grooves 121, 122, 311, and 312.

As a metal has a relatively high strength, even when the ball member 370 rolls while being in contact with the grooves 121, 122, 311, and 312 formed of a metal, it is not likely that the first to fourth grooves 121, 122, 311, and 312 may be deformed or damaged. Accordingly, the focus adjustment function of the camera module 100 may be stably performed for a relatively long period of time.

In particular, the first to fourth grooves 121, 122, 311, and 312 (that is, the first groove 121 and the second groove 311) provided in the carrier 310 may have a relatively large contact angle with the ball member 370, and when the ball member 370 presses the first to fourth grooves 121, 122, 311, and 312, a relatively large force may be applied to the contact point of the first to fourth grooves 121, 122, 311, and 312. Thus, it may be desirable that the first to fourth grooves 121, 122, 311, and 312 are formed as a metal part.

Figure 10:
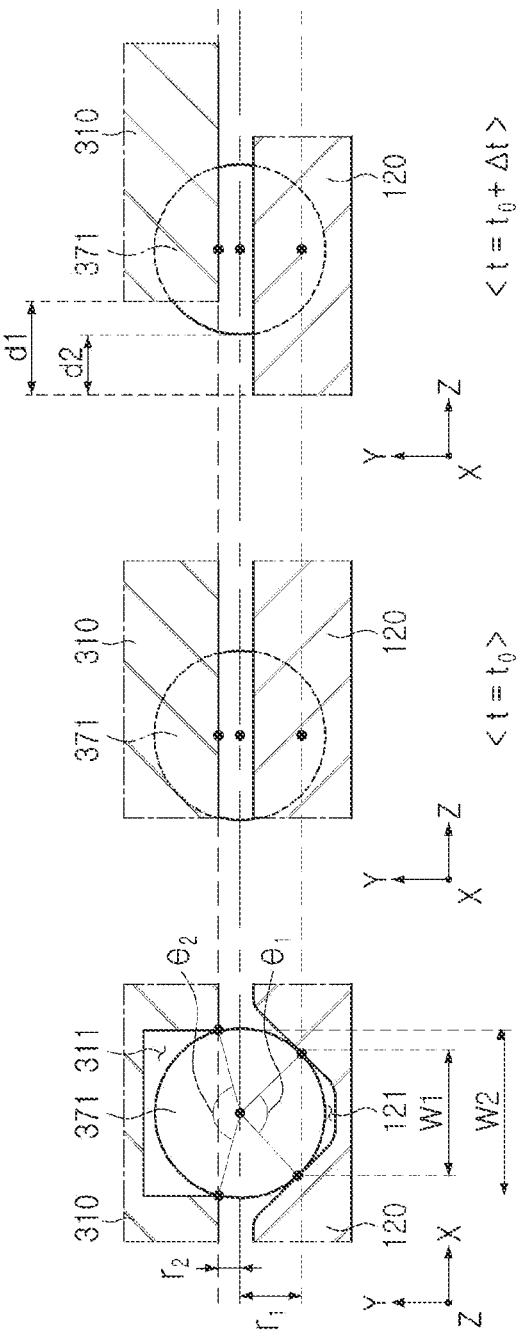
FIG. 10 is a diagram illustrating a comparison of an amount of movement between a carrier and a ball member with respect to a housing, according to an embodiment.
Figure 11:
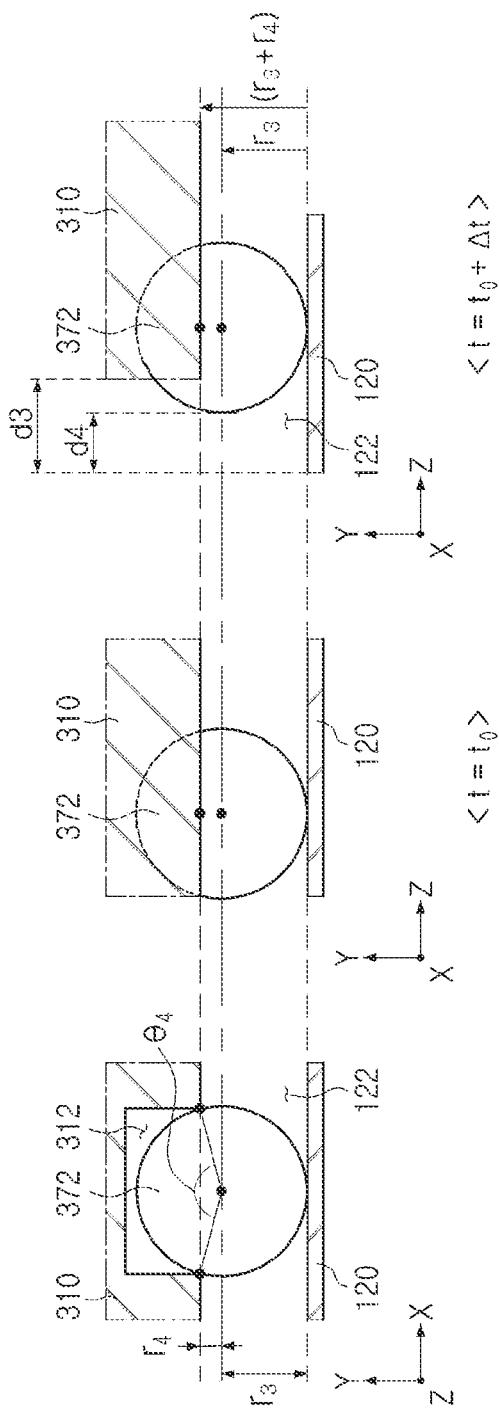
FIG. 11 is a diagram illustrating a comparison of an amount of movement between a carrier and a ball member with respect to a housing, according to another embodiment.

FIG. 10 is a diagram illustrating a comparison of the amount of movement between a carrier 310 and a ball member 370 with respect to a housing 120 in an embodiment. FIG. 11 is a diagram illustrating a comparison of the amount of movement between a carrier 310 and a ball member 370 with respect to a housing 120 according to another embodiment distinct from the embodiments in FIG. 10.

FIG. 10 illustrates the first ball member 371 illustrated in FIG. 9 and the first and second grooves 121 and 311 for guiding the first ball member 371.

The left diagram in FIG. 10 illustrates cross-section of the first ball member 371 and the first and second grooves 121 and 311 accommodating the first ball member 371, illustrated in FIG. 9. The center diagram in FIG. 10 illustrates a positional relationship among the housing 120, the first ball member 371, and the carrier 310 at a reference time point. The right diagram in FIG. 10 illustrates a positional relationship of the housing 120, the first ball member 371, and the carrier 310 when the carrier 310 moves by a predetermined distance with respect to the housing 120, after a predetermined period of time has elapsed from the reference time point.

Referring to FIG. 10, the first ball member 371 may be in contact with the first groove 121 and the second groove 311. As the carrier 310 moves in the optical axis direction with respect to the housing 120, the first ball member 371 may roll in the optical axis direction while maintaining a state of contact with the carrier 310 and the housing 120 (the force that maintains the contact may be formed by the magnet 320a and the yoke 350 provided in the carrier 310 and the housing 120, respectively)

In an embodiment, a first rotational radius $r_1$ (or a rolling radius) of the first ball member 371 with respect to the first groove 121 may be different from a second rotational radius $r_2$ of the first ball member 371 with respect to the second groove 311. In an embodiment, the first rotational radius $r_1$ may be larger than the second rotational radius $r_2$.

Referring to FIG. 10, the first ball member 371 may have two contact points with the grooves 121 and 311. In an embodiment, a distance W1 between the contact points of the first ball member 371 with the first groove 121 may be less than a distance W2 between the contact points of the first ball member 371 with the second groove 311. In an embodiment, a first contact angle $\theta_1$ of the first ball member 371 with respect to the first groove 121 may be different from a second contact angle $\theta_2$ of the first ball member 371 with respect to the second groove 311. In an embodiment, the first contact angle $\theta_1$ may be smaller than the second contact angle $\theta_2$.

Referring to FIG. 10, the first ball member 371 may roll with respect to both the housing 120 and the carrier 310 according to AF driving. In this case, a first rolling distance by which the first ball member 371 rolls with respect to the housing 120 may be different from a second rolling distance by which the ball member 371 rolls with respect to the carrier 310. Herein, a "rolling distance" is a length of a line through which a contact point between the first ball member 371 and the grooves 121 and 311 passes.

Since the first rotational radius $r_1$ of the first ball member 371 with the first groove 121 is greater than the second rotational radius $r_2$ of the first ball member 371 with the second groove 311, the first rolling distance may be greater than the second rolling distance. Assuming that the first ball member 371 rotates by $\theta$ with respect to the grooves 121, 122, 311, and 312 without slip, the first rolling distance by which the first ball member 371 rolls on the first groove 121 may be $(r_1 \times \theta)$, and the second rolling distance by which the first ball member 371 rolls on the second groove 311 may be $(r_2 \times \theta)$. Since $r_1$ is greater than $r_2$, the first rolling distance may be greater than the second rolling distance.

Referring to FIG. 10, as the carrier 310 moves in the optical axis direction with respect to the housing 120, the first ball member 371 may move in the optical axis direction. In this case, the first distance d1 by which the carrier 310 has moved with respect to the housing 120 may be different from the second distance d2 by which the first ball member 371 has moved with respect to the housing 120.

When the carrier 310 moves by the first distance d1 with respect to the housing 120, the second distance d2 by which the first ball member 371 has moved with respect to the housing 120 may be shorter than the first distance d1 by which the carrier 310 has moved with respect to the housing 120. When the ball member 371 rotates by $\theta$, the first distance d1 by which the first ball member 371 has moved with respect to the housing 120 may be $(r_1 \times \theta)$, and the first distance d1 by which the carrier 310 has moved with respect to the housing 120 may be $(r_1+r_2) \times \theta$. As both $r_1$ and $r_2$ are positive numbers, the first distance d1 may be greater than the second distance d2.

A ratio of the second distance d2 by which the first ball member 371 has moved with respect to the housing 120 to the first distance d1 by which the carrier 310 has moved with respect to the housing 120 may be defined as a ball rolling constant. That is, when the carrier 310 moves by the first distance d1 with respect to the housing 120, the second distance d2 by which the first ball member 371 has moved with respect to the housing 120 may be obtained by multiplying the first distance d1 by the ball rolling constant.

Assuming that the ball member 371 simply rolls (or rotates without slipping) with respect to the first and second grooves 121 and 311 disposed on both sides of the first ball member 371, when the first ball member 371 rotates by $\theta$, the first distance d1 may be $(r_1+r_2) \times \theta$, and the second distance d2 may be $(r_1 \times \theta)$. Therefore, the ball rolling constant may be expressed as $r_1/(r_1+r_2)$.

For example, when the first rotational radius $r_1$ and the second rotational radius $r_2$ are the same, the ball rolling constant may be 0.5. In an embodiment, in the case of the first groove 121 and the second groove 311, the first rotational radius $r_1$ may be configured to be greater than the second rotational radius $r_2$, and accordingly, the ball rolling constant $r_1/(r_1+r_2)$ may have a value greater than 0.5.

In an embodiment, the ball rolling constant may have a value greater than 0.58 and less than 1.0. In an embodiment, the first groove 121 and the second groove 311 may be provided such that the ball rolling constant may have a value approximate to 1.0. As the second rotational radius $r_2$ has a smaller value than the first rotational radius $r_1$, the ball rolling constant may have a value approximate to 1.0. For example, when the second rotational radius $r_2$ is 0, the ball rolling constant may be 1.0.

FIG. 11 illustrates the second ball member 372 and the third and fourth grooves 122 and 312 for guiding the second ball member 372.

The left diagram of FIG. 11 illustrates cross-section of the second ball member 372 and the third and fourth grooves 122 and 312 accommodating the second ball member 372 illustrated in FIG. 9. The center diagram in FIG. 11 illustrates a positional relationship of the housing 120, the second ball member 372, and the carrier 310 at a reference time point. The right diagram in FIG. 11 illustrates a positional relationship of the housing 120, the second ball member 372, and the carrier 310 when the carrier 310 has moved by a predetermined distance with respect to the housing 120 after a predetermined period of time has elapsed from the reference time point.

Referring to FIG. 11, the second ball member 372 may be in contact with the third groove 122 and the fourth groove 312. As the carrier 310 moves in the optical axis direction with respect to the housing 120, the second ball member 372 may roll in the optical axis direction while maintaining a state of contact with the carrier 310 and the housing 120.

In an embodiment, a third rotational radius $r_3$ (or a rolling radius) of the second ball member 372 with respect to the third groove 122 may be different from a fourth rotational radius $r_4$ of the second ball member 372 with respect to the fourth groove 312. In an embodiment, the third rotational radius $r_3$ may be larger than the fourth rotational radius $r_4$.

Referring to FIG. 11, the second ball member 372 may have two contact points with the fourth groove 312. In an embodiment, the second ball member 372 may have a single contact point with the third groove 122. That is, the second ball member 372 may be supported by the bottom surface of the third groove 122 at a single point.

Referring to FIG. 11, the second ball member 372 may roll with respect to both the housing 120 and the carrier 310 according to the AF driving. In this case, the third rolling distance by which the second ball member 372 has rolled with respect to the housing 120 may be different from the fourth rolling distance by which the second ball member 372 has rolled with respect to the carrier 310. Herein, a "rolling distance" is a length of a line through which a contact point between the second ball member 372 and the grooves third and fourth 122 and 312 passes.

Since the third rotational radius $r_3$ of the second ball member 372 with the third and fourth grooves 122 and 312 is greater than the fourth rotational radius $r_4$ of the second ball member 372 with the fourth groove 312, the third rolling distance may be greater than the fourth rolling distance. Assuming that the second ball member 372 rotates by θ with respect to the third and fourth grooves 122 and 312 without slip, the third rolling distance by which the second ball member 372 rolls on the third groove 122 may be ($r_3 \times θ$), and the fourth rolling distance by which the second ball member 372 rolls on the fourth groove 312 may be ($r_4 \times θ$). Since $r_3$ is greater than $r_4$, the third rolling distance may be greater than the fourth rolling distance.

Referring to FIG. 11, as the carrier 310 moves in the optical axis direction with respect to the housing 120, the second ball member 372 may move in the optical axis direction. In this case, the third distance d3 by which the carrier 310 has moved with respect to the housing 120 may be different from the fourth distance d4 by which the second ball member 372 has moved with respect to the housing 120.

When the carrier 310 has moved by the third distance d3 with respect to the housing 120, the fourth distance d4 by which the second ball member 372 has moved with respect to the housing 120 may be shorter than the third distance d3 by which the carrier 310 has moved with respect to the housing 120. When the second ball member 372 rotates by θ, the fourth distance $r_4$ by which the ball member 372 has moved with respect to the housing 120 may be ($r_3 \times θ$), and the third distance d3 by which the carrier 310 has moved with respect to the housing 120 may be ($r_3+r_4) \times θ$. Since both $r_3$ and $r_4$ are positive numbers, the third distance d3 may be greater than the fourth distance d4.

When the third rotational radius $r_3$ and the fourth rotational radius $r_4$ are the same, the ball rolling constant may be 0.5. As for the third groove 122 and the fourth groove 312, as the third rotational radius $r_3$ is larger than the fourth rotational radius $r_4$, the ball rolling constant $r_3/(r_3+r_4)$ may have a value greater than 0.5.

In an embodiment, the ball rolling constant may have a value greater than 0.58 and less than 1.0. In an embodiment, the third groove 122 and the fourth groove 312 may be provided such that the ball rolling constant may have a value approximate to 1.0. As the fourth rotational radius $r_4$ has a smaller value than the third rotational radius $r_3$, the ball rolling constant may have a value approximate to 1.0. In an embodiment, the first to fourth rotational radiuses $r_1$, $r_2$, $r_3$, and $r_4$ may be configured such that the ball rolling constant may be approximately 1.0, which enable the first and second ball members 371 and 372 to stably support the carrier 310. The detailed descriptions thereof will be described with reference to FIG. 12.

Referring to FIGS. 9 to 11, the first groove 121 accommodating the first ball member 371 and the third groove 122 accommodating the second ball member 372 may have different shapes. In the illustrated embodiment, the first ball member 371 may have two contact points with the first groove 121, while the second ball member 372 may have a single contact point with the second groove 311. However, the shape of the first to fourth grooves 121, 122, 311, and 312 accommodating the ball members 370 is not limited to the illustrated embodiment, and the shape of the first to fourth grooves 121, 122, 311, 312 may be varied in other embodiments. For example, the third groove 122 may have a V-shaped cross-sectional surface similar to the cross-sectional surface of the first groove 121, and the second ball member 372 may be supported by the third groove 122 at two points.

In the illustrated embodiment, the second groove 311 and the fourth groove 312 have the same shape, but the disclosure is not limited to this example. This disclosure merely provides a reference configuration for limiting the relationship (e.g., a rotational radius, a contact angle, a ball rolling contact with the ball member 370) between pairs of grooves 121 and 311, and 122 and 312 opposing each other on both sides of a specific ball member 370 and the ball member 370, and does not limit the relationship between grooves among the first to fourth grooves 121, 122, 311, and 312 that do not oppose each other (e.g., the first groove 121 and third groove 122 or the second groove 311 and the fourth groove 312).

Figure 12:
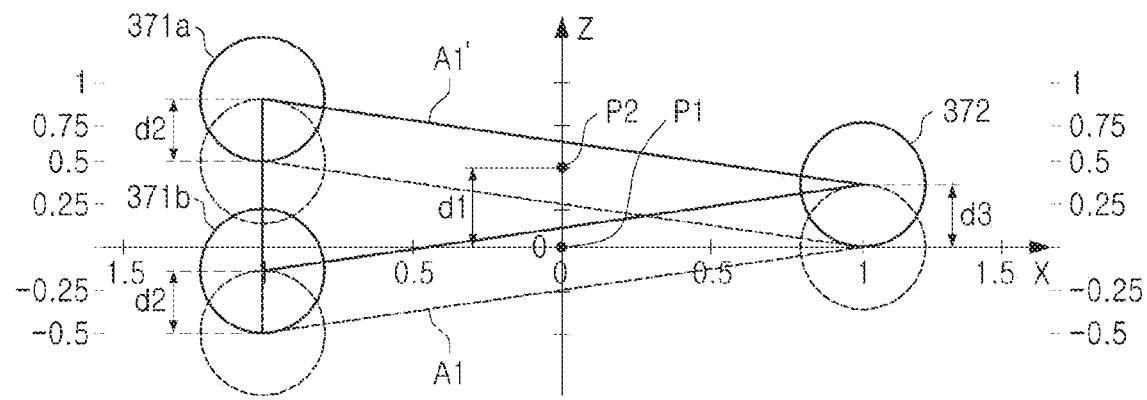
FIG. 12 is a diagram illustrating an amount of movement of ball members and an amount of movement of a center of attractive force according to driving of a carrier, according to an embodiment.

FIG. 12 is a diagram illustrating the amount of movement of first ball members 371a and 371b, and a second ball member 372, and the amount of movement of a center of attractive force according to driving of the carrier 310, according to an embodiment.

In FIG. 12, the carrier 310 may be supported by three ball members 371a, 371b, and 372. The three ball members 371a, 371b, and 372 illustrated in FIG. 12 may be a portion of the ball member 370 illustrated in FIG. 2. Also, the first ball members 371a and 371b disposed on the left side of the coordinate graph in FIG. 12 may correspond to the first ball members 371 disposed on the left side of the magnet 320a illustrated in FIG. 10. The second ball member 372 disposed on the right side of the coordinate graph in FIG. 12 may correspond to the second ball member 372 disposed on the left side of the magnet 320a illustrated in FIG. 10.

In FIG. 12, the dotted line indicates the position of the first ball members 371a and 371b, the second ball member 372, and a region (A1) defined by the first ball members 371a and 371b, and the second ball member 372 at a reference time point, which is the region where a center point (P1) of attractive force applied to the carrier 310 is located. The solid line indicates the position of the first ball members 371a and 371b, the second ball member 372, and a region (A1') defined by the first ball members 371a and 371b, and the second ball member 372 after the carrier 310 having moved upward (+Z direction) with respect to the housing 120, which is the region where a center point (P2) of attractive force applied to the carrier 310 is located.

The attractive force may be force acting between the carrier 310 and the housing 120, and may include, for example, magnetic attractive force acting between the yoke 350 of the carrier 310 and the magnet 320a of the housing 120. Due to the magnetic attractive force between the yoke 350 and the magnet 320a, the attractive force may work on the carrier 310 in a direction toward one surface of the housing 120 (e.g., the −Y direction in FIG. 2). In this case, the magnetic attractive force may work on an overall finite area of the magnet 320a. In this disclosure, a center (or a central point, or a working point) of the magnetic attractive force may be a point at which a resultant force of the attractive force applied to the magnet 320a is applied.

In an embodiment, the center of attractive force applied to the carrier 310 may be located in regions A1 and A1' (hereinafter, support regions A1 and A1') defined by the first ball members 371a and 371b, and the second ball member 372 supporting the carrier 310. For example, when the carrier 310 is supported by the three ball members 371a, 371b, and 372, the support regions A1 and A1' may have a triangular shape connecting the central points of the three ball members 371a, 371b, and 372. The support regions A1 and A1' may each have the three ball members 371a, 371b, and 372 as vertices.

In an embodiment, with reference to the side surface (or an X-Z plane) of the carrier 310, the point at which the attractive force is applied may be disposed in the triangle defined by the central points of the three ball members 371a, 371b, and 372. Since the center of the attractive force is disposed in the triangle, the carrier 310 may be stably supported by the housing 120.

In an embodiment, even after the carrier 310 moves by a predetermined distance with respect to the housing 120 according to the AF driving, the center of the attractive force may be disposed in the support region A1'.

Referring to FIG. 12, when the carrier 310 moves by 0.5 units of length in the Z-axis direction, the center of the attractive force may also move by 0.5 units of length. The ball members 371a, 371b, and 372 supporting the carrier 310 may also move in a direction in which the center of attractive force moves.

The center of the attractive force applying to the carrier 310 may be disposed in the support regions A1 and A1'. Since the distance by which the center of the attractive force has moved coincides with the distance by which the carrier 310 has moved, the support region may need to move by the distance similar to the distance by which the carrier 310 has moved, thereby stably supporting the carrier 310.

However, the distance (e.g., the second distance d2 in FIG. 10) by which the ball members 371a, 371b, 372 move with respect to the housing 120, or the distance by which the ball members 371a, 371b, and 372 follow the carrier 310 may be less than the amount of movement (e.g., the first distance d1 in FIG. 10) of the carrier 310. Accordingly, assuming that the center of the attractive force is disposed at the center of the support region A1 with reference to the reference time point, the point at which the attractive force is applied may deviate from the center of the support region A1' according to the movement of the carrier 310. As the point deviates from the center of the support region, it may be difficult for the carrier 310 to be stably supported by the ball members 371a, 371b and 372.

According to an embodiment, the ball member 370 may move by the distance similar to the amount of movement of the carrier 310. The notion that the ball member 370 may move by the distance similar to the amount of movement of the carrier 310 may indicate that, even the amount of movement of the carrier 310 is large, the center of the attractive force applied to the carrier 310 may be disposed in the support region defined by the ball members 370.

Referring to FIG. 10, when the second rotational radius $r_2$ is designed to be smaller than the first rotational radius $r_1$, the ball rolling constant may be approximate to 1, and the moving distance (the second distance d2) of the ball member 370 may be closer to the moving distance (the first distance d1) of the carrier 310.

When the first rotational radius $r_1$ and the second rotational radius $r_2$ are almost the same, the center of the attractive force applying to the carrier 310 may not be disposed in the triangle connecting the support points. For example, when the ball members 371a, 371b, and 372 are arranged as illustrated in FIG. 12 at the reference time point, and the carrier 310 moves by 1 with respect to the housing 120, the three ball members 371a, 371b, and 372 may move by 0.5. In this case, since the center of attractive force is disposed on a boundary of the triangle, the three ball members 371a, 371b, and 372 may not stably support the carrier 310. When a minute impact or vibration occurs, the contact between the ball members 371a, 371b, and 372 and the housing 120 or the carrier 310 may be released such that the carrier 310 may be shaken, which may deteriorate image quality and may damage the internal components of the camera.

In particular, the embodiments disclosed herein may be usefully applied when the AF driving distance increases. This may be because the longer the AF driving distance, the further the distance by which the center of the attractive force applied to the carrier 310 moves, and the center of the attractive force may be easily deviate the support region by the ball members 370. According to embodiments disclosed herein, even in the camera module 100 providing a relatively long AF driving distance, the carrier 310 may be stably supported, and stable AF performance and excellent image quality may be expected.

Figure 13:
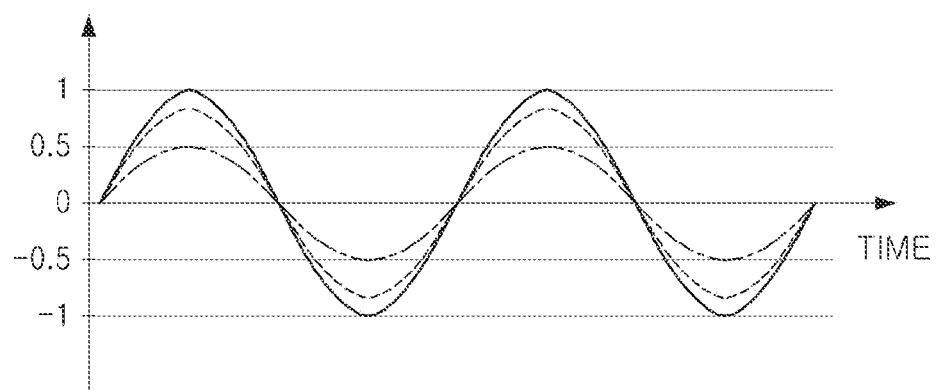
FIG. 13 includes graphs illustrating a comparison between the amount of movement of a carrier and the amount of movement of a ball member, according to an embodiment.

FIG. 13 includes graphs illustrating a comparison between the amount of movement of the carrier 310 and the amount of movement of a ball member 370. Specifically, FIG. 13 illustrates a comparison between the amount of movement of the central point of the attractive force applied to the carrier 310 and the amount of movement of the ball member 370 when the carrier 310 moves back and forth in the optical axis direction with respect to the housing 120. In the graph in FIG. 13, the Y axis represents relative displacement between the carrier 310 and the ball member 370.

The solid line in FIG. 13 indicates the displacement of the central point of the attractive force applied to the carrier 310 over time, and the dotted line indicates the displacement of the ball member 370 over time in an embodiment. The dash-single dotted line in FIG. 13 indicates the displacement of the ball member 370 over time in a general ball rolling structure in which grooves 121, 122, 311, and 312 provided on both sides of the ball member 370 are symmetrical.

Referring to FIG. 13, in an embodiment, the ball member 370 may move by the distance similarly to the amount of movement of the carrier 310. In the general ball rolling structure, the ball member 370 may move by a half of the amount of the movement of the carrier 310.

As the ball member 370 moves by the distance similar to the amount of movement of the carrier 310, the support region for supporting the carrier 310 may also be disposed adjacent to the carrier 310, which may contribute to stably supporting the carrier 310. Alternatively, even when the carrier 310 moves by a relatively long distance, the ball member 370 may stably support the carrier 310. In the general ball rolling structure, since the support region moves only by about a half of the amount of movement of the carrier 310, the section in which the carrier 310 may move may be narrower than that of the embodiment disclosed herein.

FIGS. 14A to 14I are diagrams illustrating grooves provided in one side and the other side of the ball member 370, according to an embodiment. For example, the combination of grooves provided on both sides of the first ball member 371 or the second ball member 372 may be one of the examples illustrated in FIGS. 14A to 14I.

In an embodiment, the second and fourth grooves 311 and 312 provided on the carrier 310 side may include inclined surfaces. The second and fourth grooves 311 and 312 may be defined by a bottom surface and a side surface 310b extending from the bottom surface, and the side surface 310b may be almost perpendicular to the bottom surface or may be inclined with respect to the bottom surface.

Side surfaces defining the second groove 311 and the fourth groove 312 illustrated in FIGS. 9 to 11 may have a shape extending almost vertically from the bottom surface. Accordingly, the ball member 370 may be in contact with a corner corresponding to an end (the end spaced apart from the bottom surface) of the side surface 310b.

Figure 14A:
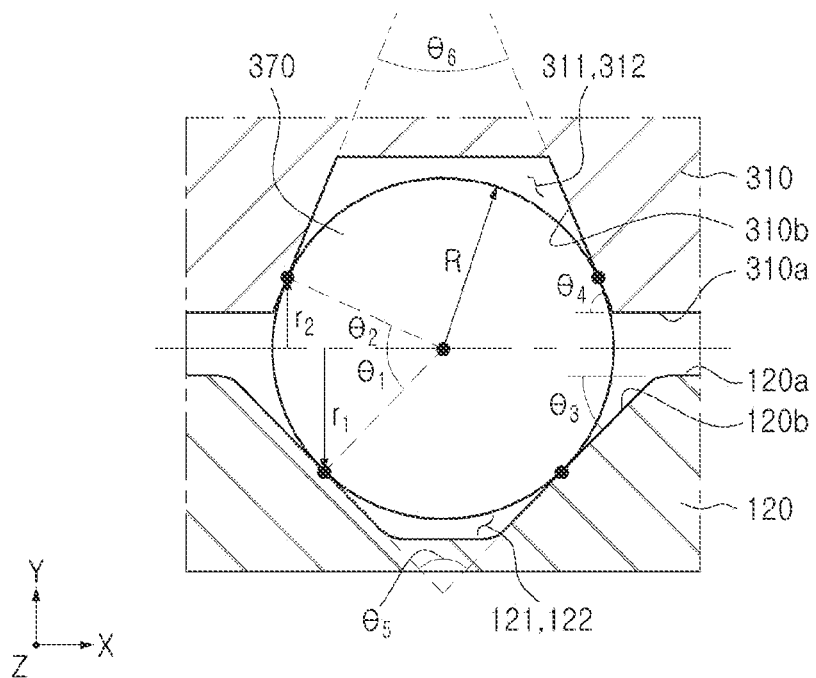
FIGS. 14A to 14I are diagrams illustrating grooves disposed in one side and another side of a ball member, according to an embodiment.

Referring to FIG. 14A, the second and fourth grooves 311 and 312 provided in the carrier 310 may have a side surface 310b inclined to the bottom surface or the opposing surfaces of the carrier 310 and the housing 120. Accordingly, the ball member 370 may be in contact with the side surface 310b.

In an embodiment, the first and third grooves 121 and 122 provided on the housing 120 side may also include a side surface 120b inclined with respect to the bottom surface or the opposing surfaces of the carrier 310 and the housing 120.

In an embodiment, the ball member 370 may be in contact with the first and third grooves 121 and 122 provided on the housing 120 side by the first angle $\theta_1$, and may be in contact with the grooves second and fourth 311 and 312 provided on the carrier 310 side by the second angle $\theta_2$. Each of the first angle $\theta_1$ and the second angle $\theta_2$ may have a value that is greater than or equal to 0 degrees and less than or equal to 90 degrees.

In this case, the first rotational radius $r_1$ of the ball member 370 with the first and third grooves 121 and 122 disposed on the housing 120 side may be obtained by multiplying the radius R of the ball member by sin ($\theta_1$), and the second rotational radius $r_2$ with the second and fourth grooves 311 and 312 disposed on the carrier 310 side may be obtained by multiplying the radius R of the ball member by the sin ($\theta_2$).

In an embodiment, the second angle $\theta_2$ may be configured to be smaller than the first angle $\theta_1$. In other words, the second rotational radius $r_2$ may be configured to be smaller than the first rotational radius $r_1$.

In an embodiment, the housing 120 and the carrier 310 may include respective surfaces 120a and 310a opposing each other in the first direction (Y-axis direction). The ball member 370 may be disposed between the opposing surfaces 120a and 310a. The ball member 370 may be in contact with each of the carrier 310 and the housing 120. The point at which the ball member 370 is in contact with the housing 120 and the center of the ball member 370 may be spaced apart from each other by $r_1$ in the first direction. Also, the point at which the ball member 370 is in contact with the carrier 310 and the center of the ball member 370 may be spaced apart from each other by $r_2$ in the first direction. $r_2$ may have a value less than a value of $r_1$.

In an embodiment, a ball group consisting of at least one ball member 370 may be disposed between the housing 120 and the carrier 310. For example, the ball members 371a, 371b, and 372 illustrated in FIG. 12 may form a single ball group.

When the carrier 310 moves in the Z-axis direction with respect to the housing 120, the ball member 370 may roll with respect to the housing 120 and the carrier 310. When the ball member 370 rotates by θ, the first distance d1 may be $(r_1+r_2)\times\theta$, and the second distance d2 may be $(r_1\times\theta)$. Accordingly, the ball rolling constant of the ball member 370 with the grooves provided on both sides may be calculated as $r_1/(r_1+r_2)$. Alternatively, the ball rolling constant may be calculated as $\sin(\theta_1)/(\sin(\theta_1)+\sin(02))$.

In an embodiment, since the second rotational radius $r_2$ is smaller than the first rotational radius $r_1$, the ball rolling constant $r_1/(r_1+r_2)$ may have a value greater than 0.5. In an embodiment, the second rotational radius $r_2$ may be configured to be much smaller than the first rotational radius $r_1$ ($r_2/r_1 \approx 0$), and the ball rolling constant may have a value of approximately 1.0.

In an embodiment, since each of the first angle $\theta_1$ and the second angle $\theta_2$ has a value of 0 degrees or greater and 90 degrees or less, and the second angle $\theta_2$ is smaller than the first angle $\theta_1$, the ball rolling constant $(\sin(\theta_1)/(\sin(\theta_1)+\sin(\theta_2)))$ may have a value greater than 0.5. In an embodiment, since the second angle $\theta_2$ is smaller than the first angle $\theta_1$ (that is, $\sin(\theta_1)/\sin(\theta_2) \approx 0$), the ball rolling constant may have a value of approximately 1.0.

In an embodiment, the side surfaces 120b defining the second and fourth grooves 311 and 312 provided in the housing 120 be inclined at a third angle $\theta_3$ with respect to the surface 120a of the housing 120 opposing the carrier 310. The side surfaces 310b defining the second and fourth grooves 311 and 312 provided in the carrier 310 may be inclined at a fourth angle $\theta_4$ with respect to a surface 310a of the carrier 310 opposing the housing 120. The third angle $\theta_3$ may be smaller than the fourth angle $\theta_4$.

In an embodiment, the angle $\theta_5$ between the side surfaces 120b defining the first and third grooves 121 and 122 provided in the housing 120 may be greater than the angle $\theta_6$ between the side surfaces 310b defining the second and fourth grooves 311 and 312 provided in the carrier 310.

The relationship between the first to fourth grooves 121, 122, 311, and 312, and the ball member 370 described in FIG. 14A may be applied to the embodiments illustrated in FIGS. 14B to 14I. In an embodiments illustrated in FIGS. 14B to 14I, the first to fourth grooves 121, 122, 311, and 312 may have different shapes, but the same configuration in which the second rotational radius $r_2$ is configured to be smaller than the first rotational radius $r_1$ may be included.

Figure 14B:
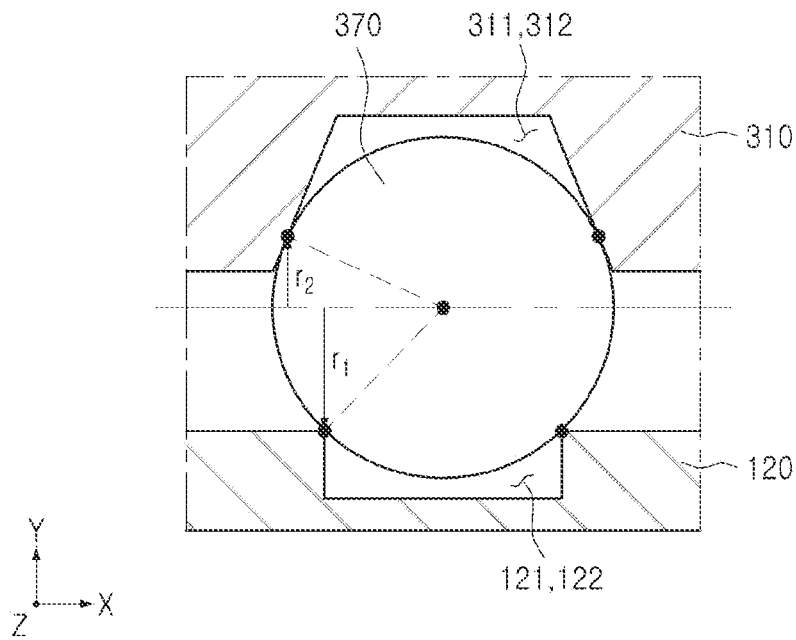

Referring to FIG. 14B, in an embodiment, the second and fourth rooves 311 and 312 of the carrier 310 may have a V shape, and the first and third grooves 121 and 122 of the housing 120 may have a quadrangular shape. The ball member 370 may be in contact with a corner of the first and third grooves 121 and 122 of the housing 120.

Figure 14C:
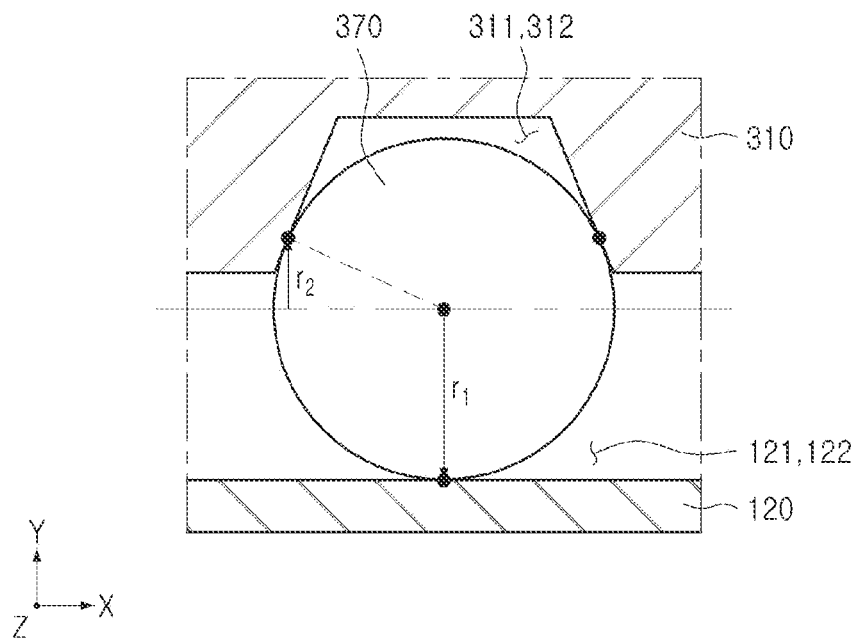

Referring to FIG. 14C, in an embodiment, the second and fourth grooves 311 and 312 provided in the carrier 310 may have a V shape, and the first and third grooves 121 and 122 provided in the housing 120 may have a relatively wide bottom surface. The ball member 370 may have a single contact point with the bottom surfaces of the first and third grooves 121 and 122 provided in the housing 120.

Figure 14D:
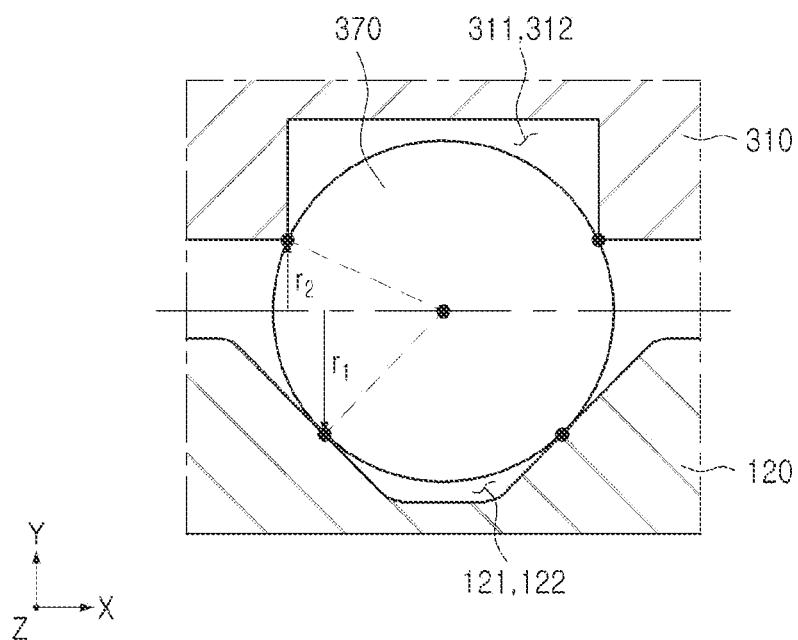

Referring to FIG. 14D, in an embodiment, the second and fourth grooves 311 and 312 provided in the carrier 310 may have a quadrangular shape, and the first and third grooves 121 and 122 provided in the housing 120 may have a V shape.

Figure 14E:
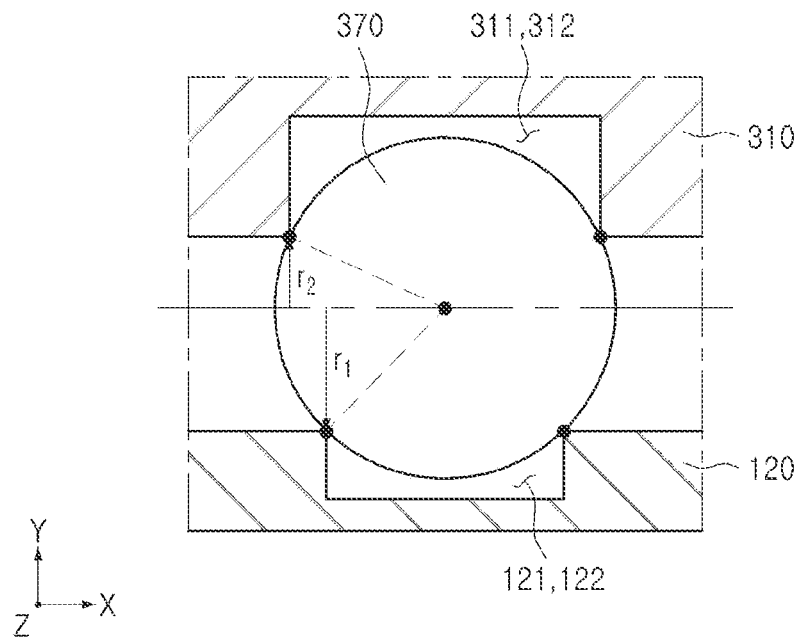

Referring to FIG. 14E, in an embodiment, the second and fourth grooves 311 and 312 provided in the carrier 310 may have a quadrangular shape, and the first and third grooves 121 and 122 provided in the housing 120 may have a quadrangular shape. The ball member 370 may be in contact with corners of the first and third grooves 121 and 122 provided in the housing 120.

Figure 14F:
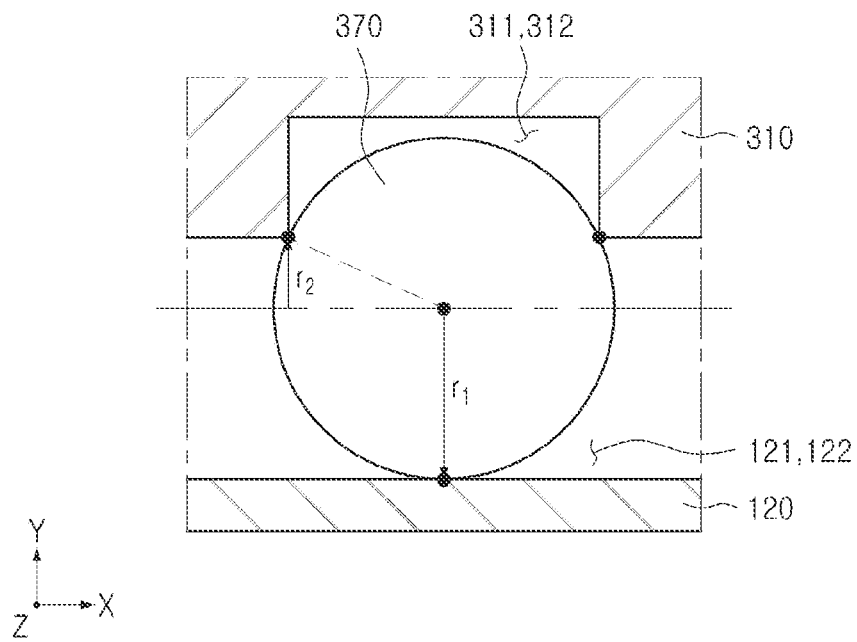

Referring to FIG. 14F, in an embodiment, the second and fourth grooves 311 and 312 provided in the carrier 310 may have a quadrangular shape, and the first and third grooves 121 and 122 provided in the housing 120 may have a relatively wide bottom surface. The ball member 370 may have a single contact point with the bottom surfaces of the first and third grooves 121 and 122 provided in the housing 120, and the first rotational radius $r_1$ may be the same as the radius of the ball member 370.

Figure 14G:
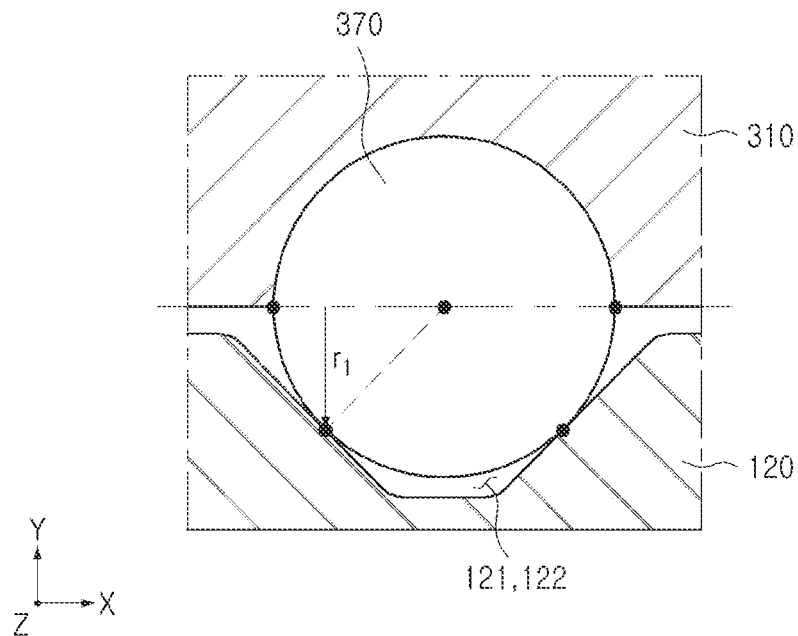
Figure 14H:
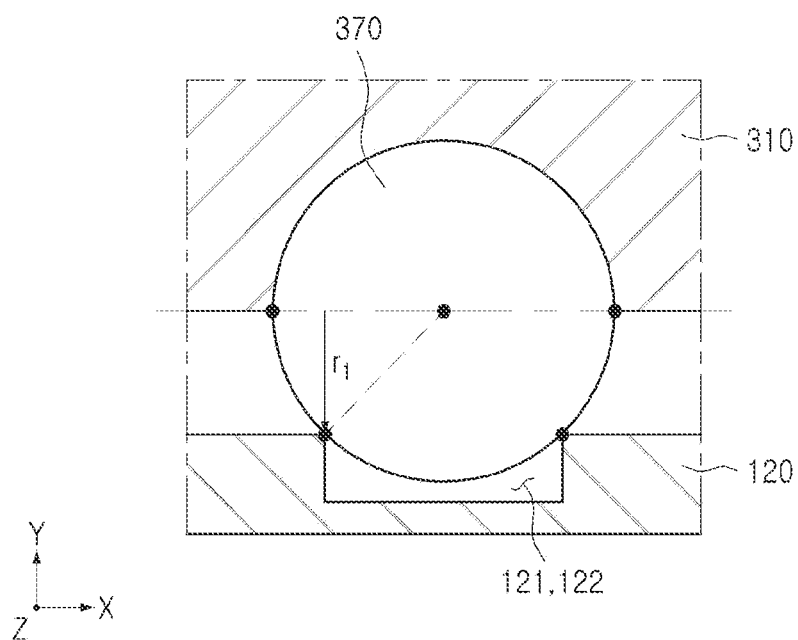
Figure 14I:
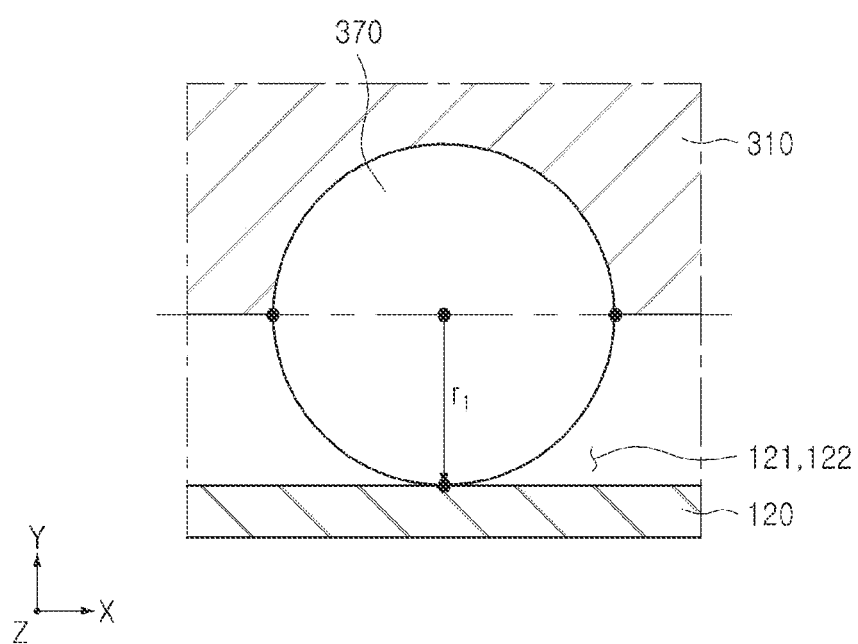

In an embodiments in FIGS. 14G to 14I, the rotational radius of the ball member 370 with the second and fourth grooves 311 and 312 provided in the carrier 310 may be 0. In this case, the distance by which the ball member 370 rolls with respect to the carrier 310 may be 0 theoretically, and the ball rolling constant may be 1.0. Accordingly, since the ball member 370 moves along with the carrier 310, the moving distances of the ball member 370 and the carrier 310 may be the same.

Referring to FIG. 14H, in an embodiment, the first and third grooves 121 and 122 provided in the housing 120 may have a quadrangular shape. The ball member 370 may be in contact with corners of the first and third grooves 121 and 122 provided in the housing 120. Referring to FIG. 14I, in an embodiment, the first and third grooves 121 and 122 provided in the housing 120 may have a relatively wide bottom surface. The ball member 370 may have a single contact point with the bottom surfaces of the first and third grooves 121 and 122 provided in the housing 120, and the first rotational radius $r_1$ may be the same as the radius of the ball member 370. The camera module 100 in an embodiment may have various functions (e.g., an automatic focal distance adjustment function, and an optical image stabilization function) and may include components for implementing these functions. However, the camera module to which the ball rolling structure illustrated in FIGS. 9 to 14I may be applied is not limited to the illustrated camera module 100. In another embodiment, a portion of the components included in the camera module 100 may not be provided. For example, the components for implementing an optical image stabilization function may not be provided in the camera module 100.

Figure 15:
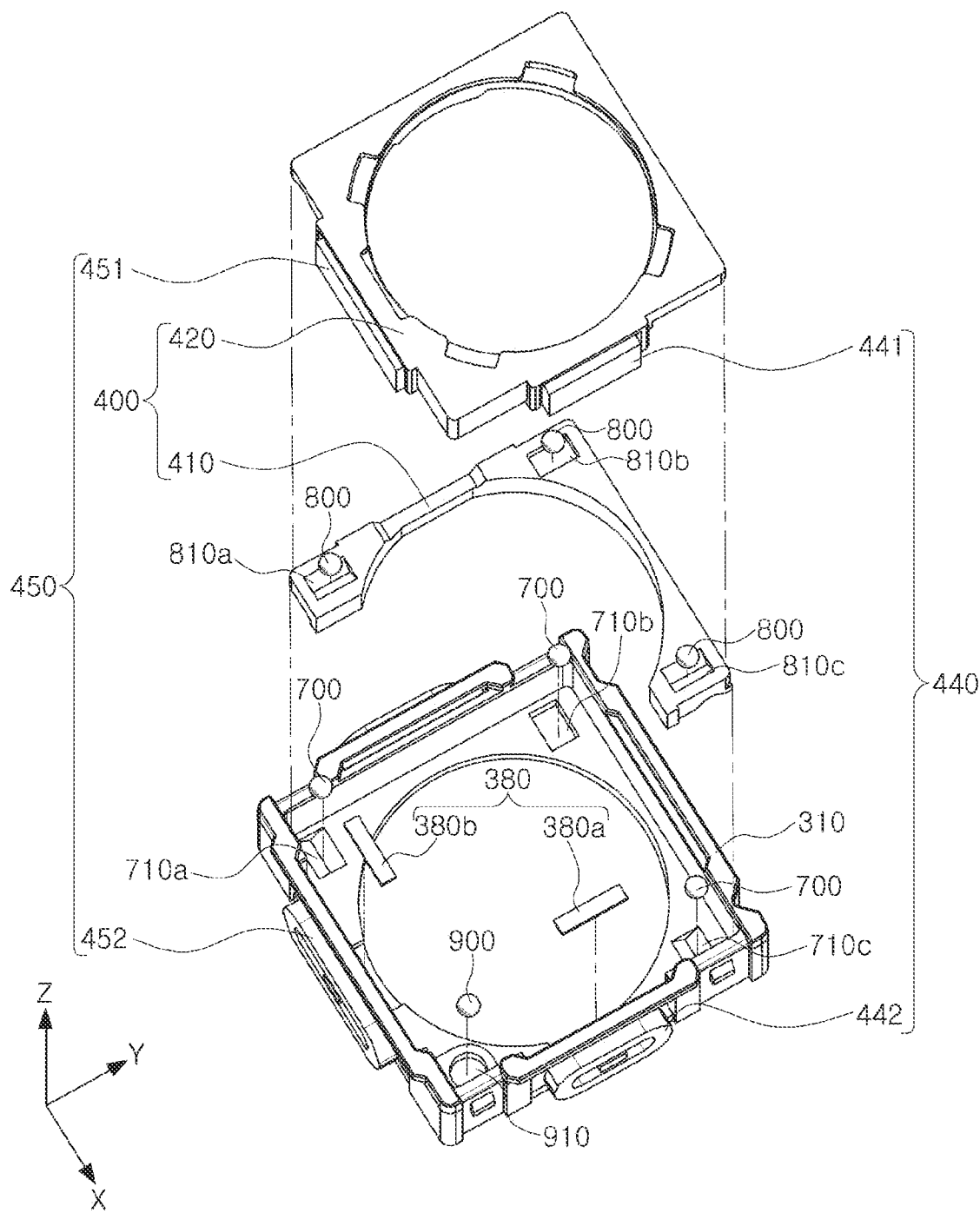
FIGS. 15 and 16 are exploded perspective diagrams illustrating a shake correction unit, according to an embodiment.
Figure 16:
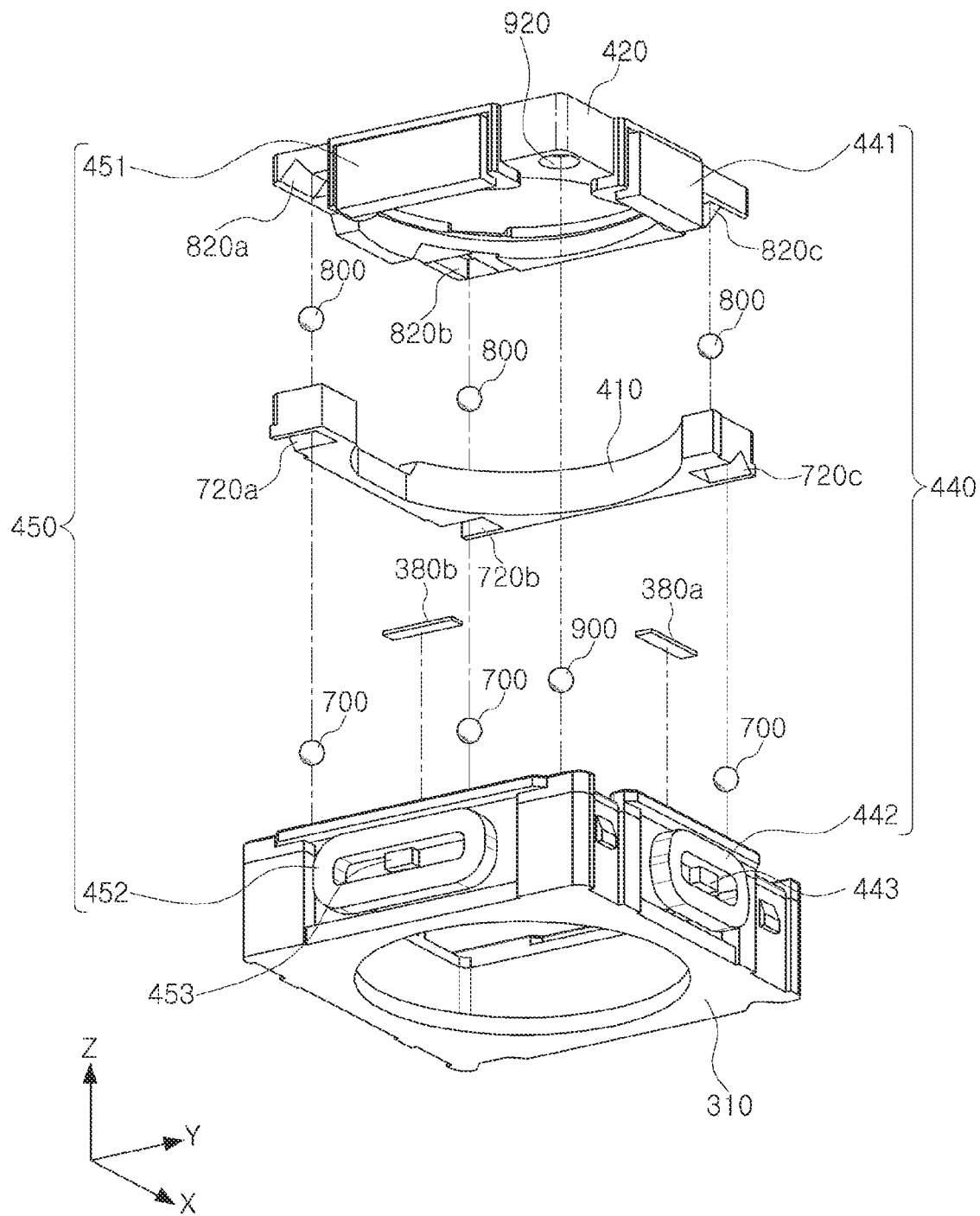

FIGS. 15 and 16 may be exploded perspective diagrams illustrating the shake correction unit 400, according to an embodiment.

The shake correction unit 400 may be used to correct blurring of an image or shaking of a video due to factors such as handshake of a user while obtaining an image or a video.

For example, when the shaking occurs during imaging due to the shaking of a user hand, the shake correction unit 400 may compensate for the shaking by providing a relative displacement corresponding to the shaking to the lens barrel 200.

For example, the shake correction unit 400 may correct the shaking by moving the lens barrel 200 in a direction perpendicular to the optical axis (Z axis).

Referring to FIGS. 15 and 16, the shake correction unit 400 may include a guide member for guiding the movement of the lens barrel 200 and a shake correction driving unit (or shake correction driving assembly) for generating driving force to move the guide member in a direction perpendicular to the optical axis (Z axis).

The guide member may include a frame 410 and a lens holder 420. The frame 410 and the lens holder 420 may be inserted into the carrier 310 and may be stacked in the optical axis (Z-axis) direction, and may guide the movement of the lens barrel 200.

The frame 410 and the lens holder 420 may include a space in which the lens barrel 200 may be inserted. The lens barrel 200 may be fixed to the lens holder 420 (see FIG. 2).

The frame 410 and the lens holder 420 may move in a direction perpendicular to the optical axis (Z axis) within the carrier 310 by the driving force generated by the shake correction driving unit.

The shake correction driving unit may include a first shake correction drive unit 440 and a second shake correction drive unit 450, and the first and second shake correction drive units 440 and 450 may include magnets 441 and 451 and coils 442 and 452, respectively.

The first shake correction driving unit 440 may generate driving force in a first axis (X axis) direction perpendicular to the optical axis (Z axis), and the second shake correction driving unit 450 may generate driving force in a second axis (Y axis) direction perpendicular to the first axis (X axis).

The second axis (Y axis) is an axis perpendicular to both the optical axis (Z axis) and the first axis (X axis).

The first shake correction driving unit 440 and the second shake correction driving unit 450 may be disposed to be oriented orthogonal to each other on a plane perpendicular to the optical axis (Z axis). For example, the magnet 441 of the first shake correction driving unit 440 and the magnet 451 of the second shake correction driving unit 450 may be disposed to be oriented orthogonal to each other on a plane perpendicular to the optical axis (Z axis).

The magnets 441 and 451 of the first and second shake correction driving units 440 and 450, respectively, may be mounted on a lens holder 420, and the coils 442 opposing the magnets 441 and 451, respectively, may be mounted on the housing 120. FIGS. 15 and 16 illustrate an example in which the coils 442 and 452 are disposed on sides of the carrier 310, for ease of description, but referring to FIG. 2, the coils 442 and 452 may be mounted on the housing 120 using the substrate 130 as a medium.

The magnets 441 and 451 may be moving members configured to move in a direction perpendicular to the optical axis (Z axis) along with the lens holder 420. The coils 442 and 452 may be fixed members fixed to the housing 120. However, the disclosure herein is not limited to the foregoing configuration, and the positions of the magnets 441 and 451 and the coils 442 and 452 may be switched with each other.

In an embodiment, a plurality of ball members for supporting the shake correction unit 400 may be provided. The plurality of ball members may guide the frame 410 and the lens holder 420 in the shake correction process, and may also maintain a gap among the carrier 310, the frame 410 and the lens holder 420.

The plurality of ball members may include a third ball member 700 and a fourth ball member 800.

The third ball member 700 may guide the movement of the shake correction unit 400 in the first axis (X-axis) direction, and the fourth ball member 800 may guide the movement of the shake correction unit 400 in the direction of the axis (Y axis).

As an example, the third ball member 700 may roll in the first axis (X axis) direction when the driving force is generated in the first axis (X axis) direction. Accordingly, the third ball member 700 may guide the movement of the frame 410 and the lens holder 420 in the first axis (X axis) direction.

Also, the fourth ball member 800 may roll in the second axis (Y axis) direction when the driving force is generated in the second axis (Y axis) direction. Accordingly, the fourth ball member 800 may guide the movement of the lens holder 420 in the second axis (Y axis) direction.

The third ball member 700 may include a plurality of third ball members disposed between the carrier 310 and the frame 410, and the fourth ball member 800 may include a plurality of fourth ball members disposed between the frame 410 and the lens holder 420.

First guide grooves 710a, 710b, 710c, 720a, 720b, and 720c each accommodating the third ball members 700 may be formed in the opposing surfaces of the carrier 310 and the frame 410, opposing each other in the optical axis (Z axis) direction. The first guide groove portions 710a, 710b, 710c, 720a, 720b, and 720c may include a plurality of guide grooves.

The third ball members 700 may be accommodated in the first guide grooves 710a, 710b, 710c, 720a, 720b, and 720c and may be inserted between the carrier 310 and the frame 410.

The movement of the third ball members 700 in the optical axis (Z axis) direction and the second axis (Y axis) direction may be limited while the third ball members 700 is accommodated in the first guide grooves 710a, 710b, 710c, 720a, 720b, and 720c, and may move only in the first axis (X axis) direction. For example, the first ball members 700 may roll only in the first axis (X axis) direction.

To this end, the plane of each of the plurality of guide grooves of the first guide grooves 710a, 710b, 710c, 720a, 720b, and 720c may have a rectangular shape of which the length in the first axis (X axis) direction is greater than a width in the second axis (Y axis) direction.

Also, some of the first guide grooves 710a, 710b, 710c, 720a, 720b, and 720c may have cross-sectional surfaces having a shape different from those of the other first guide grooves 710a, 710b, 710c, 720a, 720b, and 720c.

For example, the first guide grooves 710b and 720b may have a cross-sectional surface having an almost "U" shape, and the other first guide grooves 710a, 710c, 720a, and 720c may have a cross-sectional surface having an almost "V" shape.

The first guide grooves 710b and 720b having a "U" shaped cross-sectional surface may be disposed farthest from third guide grooves 910 and 920 among the first guide grooves 710a, 710b, 710c, 720a, 720b, and 720c (see FIGS. 15 and 16).

Second guide grooves 810a, 810b, 810c, 820a, 820b, and 820c respectively accommodating the fourth ball members 800 may be formed in the opposing surfaces of the frame 410 and the lens holder 420, opposing each other in the optical axis (Z axis) direction. The second guide grooves 810a, 810b, 810c, 820a, 820b, and 820c may include a plurality of guide grooves.

The fourth ball members 800 may be respectively accommodated in the second guide groove portions 810a, 810b, 810c, 820a, 820b, and 820c, and may be inserted between the frame 410 and the lens holder 420.

The movement of the fourth ball members 800 in the optical axis (Z axis) direction and the first axis (X axis) direction may be limited while the fourth ball members 800 are accommodated in the second guide grooves 810a, 810b, 810c, 820a, 820b, and 820c, and may only move in the second axis (Y axis) direction. For example, the fourth ball members 800 may roll only in the second axis (Y axis) direction.

To this end, the plane of each of the second guide grooves 810a, 810b, 810c, 820a, 820b, and 820c may have a rectangular shape of which the length in the second axis (Y axis) direction is greater than a width in the first axis (X axis) direction.

Also, some of the second guide grooves 810a, 810b, 810c, 820a, 820b, and 820c may have a cross-sectional surface having a shape different from those of the other guide grooves.

For example, the second guide grooves 810b and 820b may have a cross-sectional surface having an almost "U" shape, and the other second guide grooves 810a, 810c, 820a, and 820c may have a cross-sectional surface having an almost "V" shape.

The second guide groove 810b and 820b having a "U" shaped cross-sectional surface may be disposed farthest from the third guide grooves 910 and 920 among the second guide grooves 810a, 810b, 810c, 820a, 820b, and 820c (see FIGS. 15 and 16).

In an embodiment, a fifth ball member 900 configured to support movement of the lens holder 420 may be disposed between the carrier 310 and the lens holder 420.

The fifth ball member 900 may guide both the movements of the lens holder 420 in the first axis (X axis) direction and in the second axis (Y axis) direction.

As an example, when the driving force is generated in the first axis (X axis) direction, the fifth ball member 900 may roll in the first axis (X axis) direction. Accordingly, the fifth ball member 900 may guide the movement of the lens holder 420 in the first axis (X axis) direction.

Also, the fifth ball member 900 may roll in the second axis (Y axis) direction when the driving force is generated in the second axis (Y axis) direction. Accordingly, the third fifth member 900 may guide the movement of the lens holder 420 in the second axis (Y axis) direction.

The fourth ball member 800 and the fifth ball member 900 may be in contact with and may support the lens holder 420. The fourth ball member 800 and the fifth ball member 900 may be disposed on different planes (see FIGS. 16 and 19). That is, a plane on which the fourth ball member 800 is disposed may be different than a plane on which the fifth ball member 900 is disposed.

The lens holder 420 may include the magnets 441 and 451 of the first and second shake correction driving units 440 and 450, and the fourth ball members 800 and the fifth ball members 900 may be disposed on both sides of the magnets 441 and 451, respectively (see FIG. 16).

Accordingly, each of the magnets 441 and 451 of the first and second shake correction driving units 440 and 450 may be disposed between the ball members disposed on different planes.

The third guide grooves 910 and 920 for accommodating the fifth ball member 900 may be formed on the opposing surfaces of the carrier 310 and the lens holder 420, opposing each other in the optical axis (Z axis) direction.

The fifth ball member 900 may be accommodated in the fifth guide grooves 910 and 920 and may be inserted between the carrier 310 and the lens holder 420.

The movement of the fifth ball member 900 in the optical axis (Z axis) direction may be limited while the fifth ball member 900 is accommodated in the third guide grooves 910 and 920, and the fifth ball member 900 may roll in the first axis (X axis) direction and the second axis (Y axis) direction.

To this end, the planes of the third guide grooves 910 and 920 may have a circular shape. Accordingly, the shapes of the planes of the third guide grooves 910 and 920 may be different from the shapes of the planes of the first guide grooves 710a, 710b, 710c, 720a, 720b, and 720c and the shapes of the planes of the second guide grooves 810a, 810b, 810c, 820a, 820b, and 820c.

In another embodiment, the translational movement of the fifth ball member 900 in the X-axis or Y-axis directions may be limited while the fifth ball member 900 is accommodated in the third guide grooves 910 and 920. To this end, the fifth ball member 900 may have at least three contact points with at least one of the third guide grooves 910 and 920. At least one of the third guide grooves 910 and 920 may have at least three bottom surfaces, and each bottom surface may be formed to be inclined with reference to the optical axis (Z axis) direction.

For example, when at least one of the third guide grooves 910 and 920 has a triangular pyramid shape defined by three bottom surfaces, the fifth ball member 900 may be supported at three points, which may limit the movement of the fifth ball member 900 in the X-axis or Y-axis directions with respect to the carrier 410.

As another example, when at least one of the third guide grooves 910 and 920 has a quadrangular pyramid shape defined by four bottom surfaces, the fifth ball member 900 may be supported at four points, which may limit the movement of the fifth ball member 900 in the X-axis or Y-axis directions with respect to the carrier 410.

The third ball member 700 may roll in the first axis (X-axis) direction, the fourth ball member 800 may roll in the second axis (Y-axis) direction, and the fifth ball member 900 may roll in the first axis (X axis) direction and the second axis (Y axis) direction.

Accordingly, the plurality of ball members supporting the shake correction unit 400 in an embodiment may have different dispositional flexibility.

In an embodiment, the dispositional flexibility refers to independent variables required to represent the movements of the third ball member 700, the fourth ball member 800, and the fifth ball member 900, when power is applied to the shake correction unit 400 and the shake correction unit 400 moves by driving force generated in a direction perpendicular to the optical axis (Z axis).

As an example, by the driving force generated in the direction perpendicular to the optical axis (Z axis), the fifth ball member 900 may roll in the two axis (first axis (X axis) and second axis (Y axis)), and the third ball member 700 and the fourth ball member 800 may each roll along a single axis (the first axis (X axis) and the second axis (Y axis), respectively).

Accordingly, the dispositional flexibility of the fifth ball member 900 may be greater than that of the third ball member 700 and the fourth ball member 800.

When the driving force (Fx) is generated in the first axis (X axis) direction, the frame 410 and the lens holder 420 may move together in first axis (X axis) direction.

The third ball member 700 and the fifth ball member 900 may roll along the first axis (X axis). In this case, the movement of the fourth ball member 800 may be limited.

Further, when the driving force Fy is generated in the second axis (Y axis) direction, the lens holder 420 may move in the second axis (Y axis) direction.

In this case, the fourth ball member 800 and the fifth ball member 900 may roll along the second axis (Y axis). In this case, the movement of the third ball member 700 may be limited.

When the ball member rolling along the first axis (X axis) is referred to as the third ball member, and the ball member rolling along the second axis (Y axis) is referred to as the fourth ball member, the fifth ball member 900 disposed between the carrier 310 and the lens holder 420 may function as a third ball member when the shake correction unit 400 moves in the first axis (X axis) direction, and the fifth ball member 900 may function as a fourth ball member when the shake correction unit 400 moves in the second axis (Y axis) direction.

Therefore, in this case, the third ball members and the fourth ball member have a ball member shared with each other.

The lens driving device 500 in an embodiment may use a closed loop control method of sensing a position of the lens barrel 200 and providing a feedback in the shake correction process.

Accordingly, the position sensors 443 and 453 for closed loop control may be provided, and the position sensors 443 and 453 may be disposed on the internal side of the coils 442 and 452 of the first and second shake correction driving units 440 and 450 (see FIG. 16).

The position sensors 443 and 453 may be hall sensors, and the position sensors 443 and 453 may sense the position of the lens barrel 200 through the magnets 441 and 451 of the first and second shake correction driving units 440 and 450.

In an embodiment, a yoke portion 380 may be provided to maintain a state of contact between the shake correction unit 400 and of the third, fourth, and fifth ball members 700, 800, and 900.

The yoke portion 380 may be fixed to the carrier 310 and may oppose the magnets 441 and 451 of the first and second shake correction driving units 440 and 450 in the optical axis (Z axis) direction.

Accordingly, attractive force may be generated between the yoke portion 380 and the magnets 441 and 451 in the optical axis (Z axis) direction.

Since the shake correction unit 400 is pressed in the direction towards the yoke portion 380 by the attractive force acting between the yoke portion 380 and the magnets 441 and 451, the frame 410 and the lens holder 420 of the shake correction unit 400 may maintain a state of contact with the third, fourth, and fifth ball members 700, 800, and 900.

For example, by the attractive force acting between the yoke portion 380 and the magnets 441 and 451, the lens holder 420 may be pressed towards the frame 410, and accordingly, the frame 410 may be pressed towards the carrier 310.

The yoke portion 380 may include a first yoke portion 380a and a second yoke portion 380b, and may be formed of a material configured to generate attractive force between the magnets 441 and 451. For example, the yoke portion 380 may be formed of a magnetic material.

The first yoke portion 380a may oppose the magnet 441 of the first shake correction driving unit 440 in the optical axis (Z-axis) direction, and the second yoke portion 380b may oppose the magnet 451 of the second shake correction drive unit 450 in the optical axis (Z axis) direction.

In this case, the length of the first yoke portion 380*a* and the second yoke portion 380*b* in the direction perpendicular to the optical axis (Z axis) may correspond to or may be smaller than a length of the magnets 441 and 451 in the direction perpendicular to the optical axis (Z axis). In this case, when the magnets 441 and 451 move in a direction perpendicular to the optical axis (Z axis), a returning force to return to an original position may increase due to the attractive force with the yoke portion 380.

In the shake correction process, it may be necessary to continuously move the lens barrel 200 along the first axis (X axis) and the second axis (Y axis) instantly in response to the handshake of a user.

As an example, since the shaking of the camera module 100 caused by the handshake of a user occurs swiftly enough to reach several tens of Hz per second, it may be difficult to generate vibrations corresponding to the shaking of the camera module 100 with only the electromagnetic force acting between the magnets 441 and 451 and the coils 442 and 452.

Therefore, by using the returning force acting between the magnets 441 and 451 and the yoke portion 380 and the electromagnetic force acting between the magnets 441 and 451 and the coils 442 and 452 together, the lens barrel 200 may move to the first axis (X axis) and the second axis (Y axis).

Accordingly, the lens barrel 200 may move continuously in response to the shaking, and power consumption may be reduced.

In an embodiment, the yoke portion 380 may be provided to maintain a state of contact between the frame 410 and the lens holder 420 and the third, fourth, and fifth ball members 700, 800, and 900, and a stopper 210 may be provided to prevent the third, fourth, and fifth ball members 700, 800, and 900, the frame 410 and the lens holder 420 from being detached due to external impacts (see FIG. 2).

The stopper 210 may be coupled to the carrier 310 to cover at least a portion of the upper surface of the lens holder 420.

In an embodiment, since the guide member (the frame 410 and the lens holder 420) for guiding the lens barrel 200 may be included in the carrier 310 for shake correction, the sizes of the lens driving device 500 and the camera module 100 may be increased as compared to the example in which the shake correction function is not provided.

For example, with reference to the optical axis (Z axis) direction, the frame 410 and the lens holder 420 may be disposed in order in the carrier 310 in the optical axis (Z axis) direction, and accordingly, the sizes of the lens driving device 500 and the camera module 100 may increase as compared to the example in which the frame 410 and the lens holder 420 are not provided.

However, in an embodiment, the sizes of the lens driving device 500 and the camera module 100 may be reduced while including the shake correction function.

Planes of the frame 410 and the lens holder 420 may have different shapes. Positions of centers of gravity of the frame 410 and the lens holder 420 may be different.

For example, a plane of the frame 410 may have an almost "¬" shape, and a plane of the lens holder 420 may have an almost "□" shape.

Accordingly, a region in which the frame 410 is disposed and a region in which the frame 410 is not disposed may be present between the carrier 310 and the lens holder 420.

As an example, with reference to the optical axis (Z axis) direction, a region in which the frame 410 and the lens holder 420 overlap each other and a region in which frame 410 and the lens holder 420 do not overlap each other may be present.

The region in which the frame 410 and the lens holder 420 overlap each other in the optical axis (Z axis) direction may be a region between the carrier 310 and the lens holder 420 in which the frame 410 is disposed.

The region in which the frame 410 and the lens holder 420 do not overlap each other in the optical axis (Z axis) direction may be a region between the carrier 310 and the lens holder 420 in which the frame 410 is not disposed. Accordingly, in this region, the carrier 310 and the lens holder 420 may directly oppose each other in the optical axis (Z axis) direction.

The magnets 441 and 451 and the yoke 380 of the first and second shake correction driving units 440 and 450 may be disposed in a region in which the carrier 310 and the lens holder 420 directly oppose each other in the optical axis (Z axis) direction.

That is, a portion of the frame 410 that corresponds to the region in which the magnets 441 and 451 and the yoke portion 380 of the first and second shake correction driving units 440 and 450 oppose each other in optical axis (Z axis) direction may be open.

Therefore, with reference to the optical axis (Z axis) direction, the frame 410 may not be disposed between the magnets 441 and 451 and the yoke portion 380 of the first and second shake correction driving units 440 and 450, and accordingly, the magnets 441 and 451 may be disposed adjacent to the yoke portion 380.

In an embodiment, by configuring the shapes of the planes of the frame 410 and the lens holder 420 to be different, the region in which the frame 410 is not disposed may be formed between the carrier 310 and the lens holder 420, and by disposing the magnets 441 and 451 and the yoke portion 380 in this region, the magnets 441 and 451 may be disposed adjacent to the yoke portion 380.

Accordingly, in an embodiment, the sizes (the heights in the optical axis (Z axis) direction) of the lens driving device 500 and the camera module 100 may be reduced while a shake correction functionality is included.

A mounting surface of the lens holder 420 to which the magnets 441 and 451 are attached may have a shape protruding towards the bottom surface of the carrier 310 further than the other portions of the lens holder 420.

The third ball member 900 may be disposed between the carrier 310 and the lens holder 420, and may support the lens holder 420.

The magnets 441 and 451 of the first and second shake correction driving units 440 and 450 may be mounted on one surface and another surface of the lens holder 420 to be orthogonal to each other, and as attractive force works between the magnets 441 and 451 and the yoke portion 380, a pressing force biased towards the yoke portion 380 may be applied to the lens holder 420.

In this case, since the frame 410 is not disposed in the region in which the attractive force works between the magnets 441 and 451 and the yoke portion 380, the lens holder 420 may tilt by the attractive force acting between the magnets 441 and 451 and the yoke portion 380.

However, in an embodiment, the fifth ball member 900 may be disposed between the carrier 310 and the lens holder 420 to prevent the lens holder 420 from tilting.

Since the fifth ball member 900 directly supports the lens holder 420 between the carrier 310 and the lens holder 420, the fifth ball member 900 may guide both the movements of the lens holder 420 in the first axis (X axis) and the second axis (Y axis) directions.

As described above, the frame 410 may be not disposed in the region in which the attractive force works between the magnets 441 and 451 and the yoke portion 380, and the fifth ball member 900 may be disposed in the region in which the frame 410 is not disposed, such that the lens holder 420 may be supported by the fifth ball member 900, and the sizes (the heights in the optical axis (Z axis) direction) of the lens driving device 500 and the camera module 100 may be reduced while a shake correction functionality is included.

Since the biased pressing force is applied to the lens holder 420, the magnitude of the pressing forces applied to the fourth ball member 800 and the fifth ball member 900 supporting the lens holder 420 may be also different from each other.

For example, since the pressing force applied to the lens holder 420 may be largest in the region in which the magnets 441 and 451 and the yoke portion 380 oppose each other, the magnitude of pressing force applied to the fifth ball member 900 may be greater than the magnitude of pressing force applied to the fourth ball member 800.

Also, the magnitude of the pressing force applied to the fifth ball member 900 may be greater than the magnitude of the pressing force applied to the third ball member 700.

As the sizes of the lens driving device 500 and the camera module 100 in an embodiment are reduced, a portion of the lens barrel 200 may maintain a state in which the portion of the lens barrel 200 protrudes externally of the case 110 (see FIG. 1).

As an example, even when the lens barrel 200 is disposed at the lowest point in the optical axis (Z axis) direction, a portion of the lens barrel 200 may protrude externally of the case 110.

According to the aforementioned embodiments, a lens driving device and a camera module including the same may have a reduced size while having a shake correction function.

Also, a camera module disclosed herein may stably support a lens or a structure accommodating the lens, thereby providing an autofocus function of excellent performance. For example, by including the structure of the camera module, the lens or the structure accommodating the lens may be stably supported by the camera housing, and the driving distance of the lens required for autofocusing adjustment may increase.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a housing;
a carrier disposed to oppose the housing in a first direction and to move in a second direction perpendicular to the first direction; and
a first ball member disposed between opposing surfaces of the carrier and the housing,
wherein the housing is in contact with the first ball member at two first points, and the carrier is in contact with the first ball member at two second points, and
wherein a distance in the first direction from a center of the ball member to each of the first points is greater than a distance in the first direction from the center of the ball member to each of the second points.

2. The camera module of claim 1, wherein the first ball member is disposed between the housing and the carrier, and is configured to support the carrier in the first direction.

3. The camera module of claim 1, further comprising:
a first magnetic member disposed in the carrier; and
a second magnetic member disposed in the housing and configured to generate a magnetic attractive force in the first direction between the first magnetic member and the second magnetic member.

4. The camera module of claim 3, further comprising at least one second ball member disposed between the housing and the carrier,
wherein the first ball member and the at least one second ball member includes at least three ball members, and
wherein, while the carrier moves with respect to the housing, a center of the magnetic attractive force between the first magnetic member and the second magnetic member is disposed in a region having the at least three ball members as vertices.

5. The camera module of claim 4, wherein two or more of the at least three ball members are disposed on one side of a movement path of the first magnetic member, and one or more of the at least three ball members is disposed on another side of the movement path of the first magnetic member.

6. The camera module of claim 1, wherein the first ball member is partially accommodated in a first groove disposed in the housing and a second groove disposed in the carrier.

7. The camera module of claim 6, wherein the first ball member is supported by the first groove at the two first points, and is supported by the second groove at the two second points.

8. The camera module of claim 6, wherein the first groove has a V-shaped cross-sectional surface, and the second groove has a quadrangular cross-sectional surface.

9. The camera module of claim 6, wherein either one or both of the first groove and the second groove is formed by a metal member insert molded into the carrier.

10. The camera module of claim 7, wherein, when the first ball member is supported by the first groove at the two first points, a distance between the two first points is less than a distance between the two second points.

11. The camera module of claim 6, wherein a side surface of the first groove is inclined at a first angle with respect to the opposing surfaces, and a side surface of the second groove is inclined at a second angle or vertical with respect to the opposing surfaces, and
wherein the second angle is greater than the first angle.

12. The camera module of claim 1, further comprising:
at least one lens,
wherein the carrier is configured to move in a direction parallel to an optical axis of the at least one lens.

13. A camera module, comprising:
a housing;
a carrier configured to move with respect to the housing; and
a first ball member disposed between the carrier and the housing,
wherein the first ball member is configured to roll while being in contact with the housing at two first points and in contact with the carrier at two second points, and, in a case in which the first ball member rolls without sliding while being in contact with the carrier and the housing, a rotational radius (r1) of the first ball member with respect to the housing is greater than a rotational radius (r2) of the first ball member with respect to the carrier.

14. The camera module of claim 13, wherein a ratio of an amount of movement of the first ball member with respect to the housing to an amount of movement of the carrier with respect to the housing is determined by r1/(r1+r2), and is greater than 0.58 and less than 1.0.

15. The camera module of claim 13, further comprising:
a first magnetic member disposed in the carrier; and
a second magnetic member disposed in the housing and configured to generate a magnetic attractive force between the first magnetic member and the second magnetic member.

16. The camera module of claim 15, further comprising at least one second ball member disposed between the housing and the carrier,
wherein the first ball member and the at least one second ball member includes at least three ball members, and
wherein, while the carrier moves with respect to the housing, a center of the magnetic attractive force between the first magnetic member and the second magnetic member is disposed in a region having the at least three ball members as vertices.

17. The camera module of claim 15, wherein
the first ball member includes two first ball members disposed on one side of the first magnetic member, with respect to a movement path of the first magnetic member,
a second ball member is disposed on another side of the first magnetic member, with respect to the movement path, and
while the carrier moves with respect to the housing, a center of the magnetic attractive force between the first magnetic member and the second magnetic member is disposed in a triangular region having the two first ball members and the second ball member as vertices.

18. The camera module of claim 15, wherein the carrier is further configured to move in a direction parallel to an optical axis of the camera module, and the first ball member is further configured to roll to move in the direction parallel to the optical axis.

19. A camera module, comprising:
a housing;
a carrier configured to move in an optical axis direction with respect to the housing;
two or more ball members disposed between the carrier and the housing, and configured to roll in the optical axis direction to guide movement of the carrier in the optical axis direction;
a first magnetic member disposed in the carrier; and
a second magnetic member disposed in the housing and configured to generate a magnetic attractive force between the first magnetic member and the second magnetic member to maintain the two or more ball members in contact with the carrier and the housing,
wherein a first ball member, among the two or more ball members, is in contact with the housing at two first points and in contact with the carrier at two second points,
wherein, while the carrier moves with respect to the housing, a center of the magnetic attractive force between the first magnetic member and the second magnetic member is disposed in a region having the two or more ball members as vertices,
wherein the carrier opposes the housing in a direction perpendicular to the optical axis direction, and
wherein a distance from a center of the first ball member to the two first points in the direction perpendicular to the optical axis direction is greater than a distance from the center of the first ball member to the two second points in the direction perpendicular to the optical axis direction.

20. The camera module of claim 19, wherein the two or more ball members comprise at least three ball members.

21. The camera module of claim 20, wherein the at least three ball members comprise:
two first ball members disposed on one side of the first magnetic member, with respect to a movement path of the first magnetic member; and
a second ball member disposed on another side of the first magnetic member, with respect to the movement path, and
wherein the region having the at least three ball members as vertices is a triangle having the two first ball members and the second ball member as vertices.

22. The camera module of claim 19, wherein a ratio of a movement distance of the first ball member in the optical axis direction with respect to the housing to a movement distance of the carrier in the optical axis direction with respect to the housing is greater than 0.58 and less than 1.0.

23. An electronic device, comprising:
a camera module comprising:
a housing mounted in the electronic device;
a carrier disposed to oppose the housing in a first direction and to move in a second direction perpendicular to the first direction;
a lens module attached to the carrier and configured to move in the second direction with the carrier; and
a ball member disposed between opposing surfaces of the carrier and the housing,
wherein the housing is in contact with the ball member at two first points, and the carrier is in contact with the ball member at two second points, and
wherein a distance in the first direction from a center of the ball member to the two first points is greater than a distance in the first direction from the center of the ball member to the two second points.

24. The electronic device of claim 23, wherein the second direction is parallel to an optical axis of the lens module.

* * * * *